United States Patent
Shido et al.

(10) Patent No.: US 12,485,659 B2
(45) Date of Patent: Dec. 2, 2025

(54) ATTACHMENT CONFIGURATION OF AND METHOD FOR APPLYING DECORATIVE LAMINATES

(71) Applicant: AICA KOGYO CO., LTD., Kiyosu (JP)

(72) Inventors: Kazuya Shido, Kiyosu (JP); Atsushi Sato, Kiyosu (JP); Tatsuru Kondo, Kiyosu (JP); Takahiro Kojima, Kiyosu (JP); Keisuke Shitan, Kiyosu (JP)

(73) Assignee: AICA KOGYO CO., LTD, Aichi (JP)

( * ) Notice: Subject to any disclaimer, the term of this patent is extended or adjusted under 35 U.S.C. 154(b) by 260 days.

(21) Appl. No.: 17/906,008

(22) PCT Filed: Aug. 26, 2020

(86) PCT No.: PCT/JP2020/032255
§ 371 (c)(1),
(2) Date: Sep. 9, 2022

(87) PCT Pub. No.: WO2021/181721
PCT Pub. Date: Sep. 16, 2021

(65) Prior Publication Data
US 2023/0109509 A1   Apr. 6, 2023

(30) Foreign Application Priority Data
Mar. 10, 2020   (JP) ................. 2020-040431

(51) Int. Cl.
```
B32B 29/06    (2006.01)
B32B 3/14     (2006.01)
B32B 5/02     (2006.01)
B32B 7/14     (2006.01)
B32B 21/02    (2006.01)
B32B 21/06    (2006.01)
B32B 21/10    (2006.01)
B32B 29/00    (2006.01)
B32B 29/02    (2006.01)
B32B 37/12    (2006.01)
B32B 38/00    (2006.01)
```
(52) U.S. Cl.
CPC ............... *B32B 29/06* (2013.01); *B32B 3/14* (2013.01); *B32B 5/022* (2013.01); *B32B 7/14* (2013.01); *B32B 21/02* (2013.01); *B32B 21/06* (2013.01); *B32B 21/10* (2013.01); *B32B 29/005* (2013.01); *B32B 29/02* (2013.01); *B32B 37/12* (2013.01); *B32B 38/0004* (2013.01); *B32B 2250/05* (2013.01); *B32B 2255/12* (2013.01); *B32B 2255/26* (2013.01); *B32B 2260/021* (2013.01); *B32B 2260/028* (2013.01); *B32B 2260/046* (2013.01); *B32B 2262/101* (2013.01); *B32B 2264/1023* (2020.08); *B32B 2264/104* (2013.01); *B32B 2307/3065* (2013.01); *B32B 2307/732* (2013.01); *B32B 2317/16* (2013.01); *B32B 2451/00* (2013.01)

(58) Field of Classification Search
None
See application file for complete search history.

(56) References Cited

U.S. PATENT DOCUMENTS

| | | | |
|---|---|---|---|
| 6,333,280 B1 * | 12/2001 | Hashimoto | B44C 5/0423 442/247 |
| 2010/0136351 A1 * | 6/2010 | Iwasaki | B32B 5/022 428/524 |
| 2014/0242871 A1 | 8/2014 | Yasui et al. | |
| 2017/0284026 A1 | 10/2017 | Skuse et al. | |

FOREIGN PATENT DOCUMENTS

| | | |
|---|---|---|
| CN | 1955425 A | 5/2007 |
| EP | 0899092 B1 | 7/2001 |
| EP | 2767392 A1 | 8/2014 |
| JP | H1061144 A | 3/1998 |
| JP | 2002294970 A | 10/2002 |
| JP | 2005169924 A | 6/2005 |
| JP | 3117950 U | 1/2006 |
| JP | 2007077387 A | 3/2007 |
| JP | 2007077687 A | 3/2007 |
| JP | 2009084367 A | 4/2009 |
| KR | 20180132768 A | 12/2018 |

OTHER PUBLICATIONS

Third Office Action of Corresponding Chinese Patent Application No. 202110259401.9, dated Oct. 26, 2024, 15 pages.
International Search Report from corresponding PCT Appln. No. PCT/JP2020/032255, dated Nov. 18, 2020.
Written Opinion from corresponding PCT Appln. No. PCT/JP2020/032255 dated Nov. 18, 2020.

(Continued)

*Primary Examiner* — Sheeba Ahmed
(74) *Attorney, Agent, or Firm* — Grossman, Tucker, Perreault & Pfleger, PLLC; Steven J. Grossman

(57) ABSTRACT

The present disclosure is an attachment configuration of decorative laminates comprising at least paired two decorative laminates attached to a base material. The at least paired two decorative laminates each have a double-sided adhesive tape adhered to an outer circumferential portion on a back side of the decorative laminate and a double-sided adhesive tape adhered to an inner portion inward of the outer circumferential portion to form a section. Elastic glue is applied to an outside of the double-sided adhesive tape for the outer circumferential portion on the back side. The elastic glue is also applied within the section formed with the double-sided adhesive tape for the inner portion. The at least paired two decorative laminates are fixed to the base material on their respective back sides while being spaced apart from each other.

11 Claims, 18 Drawing Sheets

(56) References Cited

OTHER PUBLICATIONS

International Preliminary Report on Patentability from corresponding PCT Appln. No. PCT/JP2020/032255, dated Oct. 13, 2021.
Written Opinion of the International Preliminary Examining Authority from corresponding PCT Appln. No. PCT/JP2020/032255 dated Jul. 29, 2021.
Office Action dated Mar. 26, 2024 in the corresponding Taiwanese Patent Application No. 110108548.
1 Office Action in corresponding Chinese Patent Application No. 202110259401.9., dated Jun. 15, 2024, 15 pages.
Extended European Search Report dated Apr. 11, 2024 in the corresponding European Patent Application No. 20923698.3.
Office Action dated Nov. 22, 2023 in corresponding Korean Patent Application No. 10-2022-7035143, 39 pages.
Office Action dated Nov. 23, 2023 in corresponding Chinese Patent Application No. 202110259401.9, 19 pages.
Examination Report from corresponding Australian Patent Application No. 2020434890, dated Jan. 21, 2025. 6 pages.
Notice of Reasons for Rejection dated Mar. 11, 2025 in the corresponding Chinese Patent Application No. 202110259401.9.
Examination Report of New Zealand Patent Application No. 793013; Dated Aug. 4, 2025; 3 pages.

* cited by examiner

ATTACHMENT CONFIGURATION OF AND METHOD FOR APPLYING DECORATIVE LAMINATES

CROSS-REFERENCE TO RELATED APPLICATION

This application is a 371 of international application number PCT/JP2020/032255 filed Aug. 26, 2020 which claims the benefit of Japanese Patent Application No. 2020-040431 filed on Mar. 10, 2020 with the Japan Patent Office, and the entire disclosure of Japanese Patent Application No. 2020-040431 is incorporated herein by reference.

TECHNICAL FIELD

The present disclosure relates to an attachment configuration of and a method of applying decorative laminates.

BACKGROUND ART

Thermosetting resin decorative laminates, such as melamine decorative laminates, are conventionally known. The thermosetting resin decorative laminates are widely used as interior materials for horizontal surfaces, such as top boards and counters, and vertical surfaces such as wall surfaces. The thermosetting resin decorative laminates have difficulty in being fixed to a base material by nails, screws, or the like when being applied. For this reason, thermosetting resin decorative laminates have been applied to base materials using glue. As a related application configuration, the Applicant discloses, in Patent Document 1, an attachment configuration of decorative laminates that uses both a double-sided adhesive tape and elastic glue.

Decorative laminates show a great dimensional change. When adjacent decorative laminates are brought into abutment for attachment, the decorative laminates are sometimes peeled off each other at portions where the decorative laminates abut. To address this problem, proposals have been made to create a joint between decorative laminates by gapping construction and to fill the joint with a jointer made from vinyl chloride resin, as shown in Patent Document 2.

CITATION LIST

Patent Literature

PTL 1: Patent Document 1: Chinese Unexamined Patent Application Publication No. 1955425
PTL 2: Patent Document 2: Japanese Unexamined Patent Application Publication No. H10-61144A

PROBLEMS TO BE SOLVED BY THE INVENTION

According to the conventional attachment configuration disclosed in Patent Document 1, however, the double-sided adhesive tape provides weakened adhesive strength. There is an issue that a decorative laminate slides down due to its weight even if an effort is made to temporarily attach the decorative laminate to a base material. The adhesive strength tends to weaken during a low temperature period of time, particularly in winter.

The decorative laminate shows a great dimensional change, which also causes an issue that the decorative laminate cannot be fixed to the base material with a double-sided adhesive tape lacking adhesive strength when warpage occurs in the decorative laminate.

Further, there is an issue that a smaller sized decorative laminate can be worked with one person during application work, whereas the larger the size of the decorative laminate, the more labor and time are required for precise application, which further requires application to be performed by two or more people. In addition, when a large-sized decorative laminate is cut, the cut decorative laminate has degraded precision of the size, which causes difficulty in finishing a cut surface in the form of straight line. This consequently results in an issue that the joint portion formed by gapping construction is not in the form of straight line.

The present disclosure is considered in view of the aforementioned circumstances. It is desirable to provide an attachment configuration of and a method of applying decorative laminates that enable application of the decorative laminates to a base material with ease and provide fine finish.

MEANS FOR SOLVING THE PROBLEMS

The present disclosure is an attachment configuration of decorative laminates comprising at least paired two decorative laminates attached to a base material.

The at least paired two decorative laminates each have a double-sided adhesive tape adhered to an outer circumferential on a back side of the decorative laminate and a double-sided adhesive tape adhered to an inner portion inward of the outer circumferential portion to form a section. Elastic glue is applied to an outside of the double-sided adhesive tape for the outer circumferential portion on the back side. The elastic glue is also applied within the section formed with the double-sided adhesive tape for the inner portion.

The at least paired two decorative laminates are fixed to the base material on their respective back sides while being spaced apart from each other.

The double-sided adhesive tape has the entire thickness of 0.03 to 10 mm and has an adhesive strength of 3 to 30 N/20 mm at a temperature of 23° C. or an adhesive strength of 1 to 20 N/20 mm at a temperature of 0° C. according to 90-degree peel test based on JIS Z 0237. Also, the present disclosure is a method of applying decorative laminates to a base material in order to obtain the above attachment configuration of the decorative laminates. The method comprises the following (A) to (D):

(A) cutting a one decorative laminate of at least paired two decorative laminates into a desired size using a member that has a rectangular shape in a plan view, the member including a difference for one step in height and being provided with an upper planar portion, a lower planar portion, and a side wall;

(B) adhering a double-sided adhesive tape to an outer circumferential portion on a back side of the one decorative laminate obtained in the cutting (A) and adhering a double-sided adhesive tape to an inner portion inward of the outer circumferential portion to form a section, and applying elastic glue to an outside of the double-sided adhesive tape for the outer circumferential portion on the back side and applying the elastic glue within the section formed with the double-sided adhesive tape for the inner portion;

(C) attaching a vacuum lifter itself to a front surface of the one decorative laminate obtained in the adhering (B)

and pressing the back side toward the base material, to thereby fix the one decorative laminate to the base material; and (D) treating the other decorative laminate of the at least paired two decorative laminates in the same manner as in the above (A), (B), and (C) and fixing the other decorative laminate to the base material with a distance made between the one decorative laminate and the other decorative laminate.

EFFECTS OF THE INVENTION

According to the attachment configuration of the decorative laminates of the present disclosure, the decorative laminates each are temporarily fixed to the base material in a sufficient manner. Therefore, a problem is unlikely to occur until the elastic glue is cured, for example, the decorative laminate is inhibited from sliding down due to its own weight.

Even when the decorative laminate shows a great dimensional change and warpage occurs in the decorative laminate, the elastic glue absorbs the dimensional change of the decorative laminate. Therefore, it is possible to fix the decorative laminate to the base material, reducing warpage of the decorative laminate.

According to the method of applying decorative laminates of the present disclosure, each decorative laminate has improved accuracy in size when being cut. As a result, it is possible to finish a cut surface in the form of straight line.

EXPLANATION OF REFERENCE NUMERALS

1 . . . elastic glue, 2 . . . double-sided adhesive tape, 3 . . . blank space, 4 . . . joint, 5a . . . flat type jointer, 5b . . . jointer of arrow head type for external corner (also referred to as jointer for external corner), 5c . . . jointer of L-letter type for external corner (also referred to as jointer for external corner), 5c1 . . . decorative laminate, 5c2 . . . aluminum base material, 5d . . . jointer of fit type for internal corner (also referred to as jointer for internal corner), 5d1 . . . cover member (male fitting member), 5d2 . . . base member (female fitting member), 5e . . . jointer of L-letter type for internal corner (also referred to as jointer for internal corner), 6 . . . caulking agent, 7 . . . joint bottom tape, 9 . . . decorative laminate, 11 . . . decorative laminate to which double-sided adhesive tape is adhered and elastic glue is applied, 12 . . . decorative laminate to which double-sided adhesive tape is adhered and elastic glue is applied, 15 . . . stepped member, 15a . . . first board body, 15b . . . second board body, 15c . . . upper planar portion, 15d . . . lower planar portion, 15e . . . side wall, 16 . . . electric circular saw, 16a . . . blade guide of electric circular saw, 16b . . . blade of electric circular saw, 17 . . . glass vacuum lifter, 21 . . . base material, L . . . distance between an end surface facing blade and blade, w . . . width of lower planar portion, 30 . . . gap, 31 . . . gap, 32 . . . gap, 32' . . . gap, t . . . width of gap, t1 . . . width of gap, t2 . . . width of gap, t2' . . . width of gap, t3 . . . width of gap

MODE FOR CARRYING OUT THE INVENTION

Figure 1:
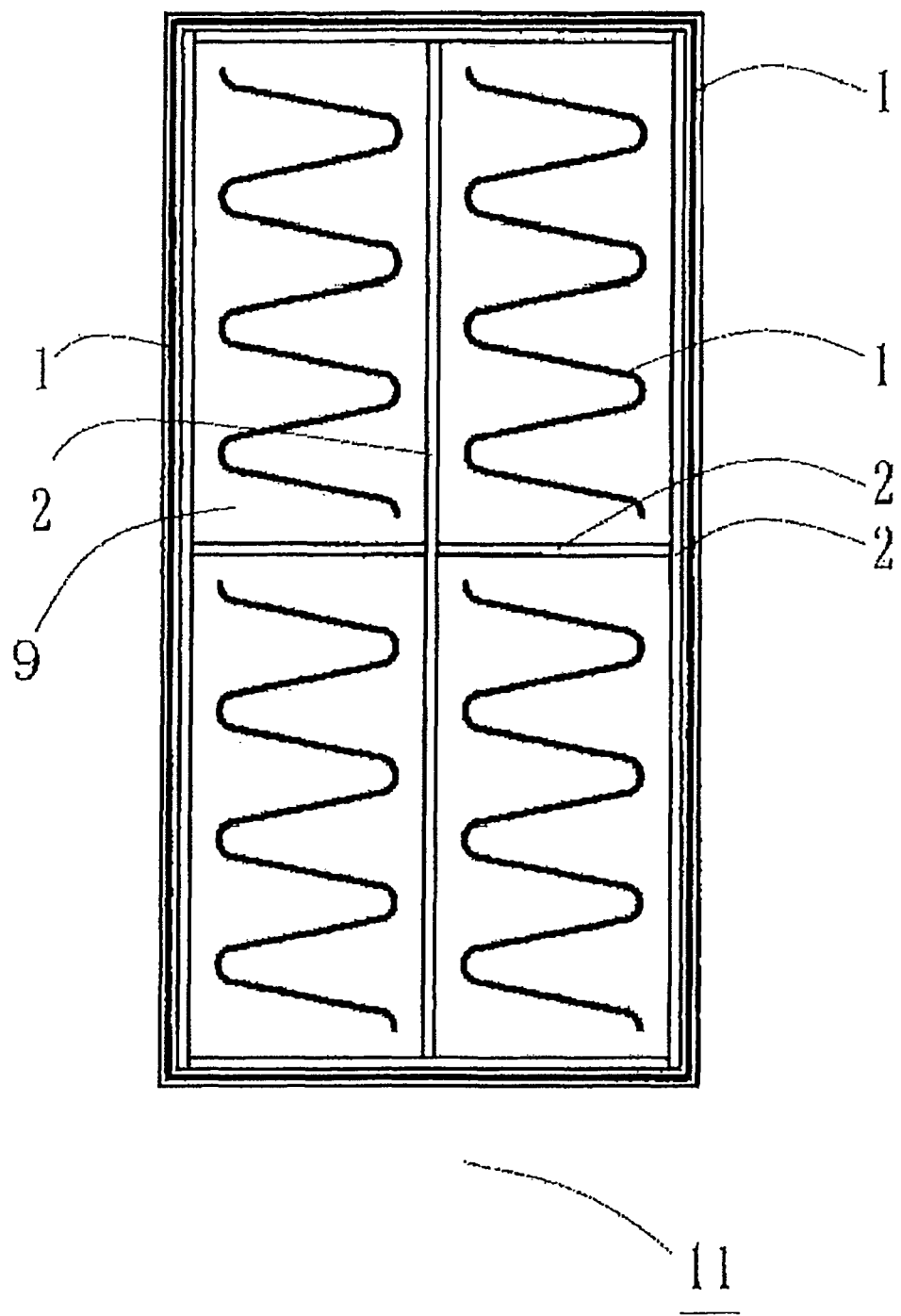
FIG. 1 is a plan view of a decorative laminate having four sections, the decorative laminate having double-sided adhesive tapes adhered to a back side thereof and elastic glue applied to the back side.
Figure 2:
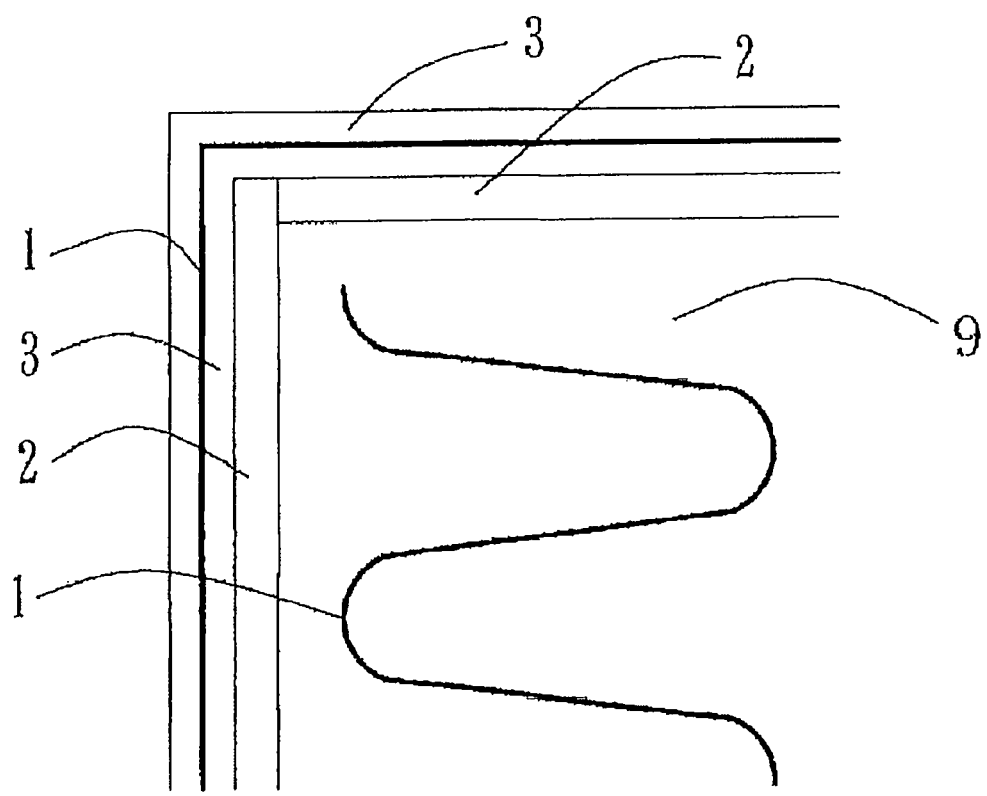
FIG. 2 is an enlarged plan view of a main part of FIG. 1.

FIG. 1 is a plan view of a decorative laminate (9) that is cut into a desired size. The decorative laminate has double-sided adhesive tapes adhered to a back side thereof and elastic glue applied to the back side. FIG. 2 is an enlarged plan view of a main part of FIG. 1. On the back side of the decorative laminate, the double-sided adhesive tape (2) for outer side of the decorative laminate is adhered to an outer circumferential portion at a position 1 to 300 mm inward of, and more preferably 25 to 35 mm inward of an outer edge of the back side. Further, the double-sided adhesive tape (2) for inner side of the decorative laminate is adhered to an inner portion that is located inward of the double-sided adhesive tape (2) for outer side. The inner portion is partitioned by the double-sided adhesive tape for inner side, to thereby form sections (four sections).

The back side of the decorative laminate includes a blank space (3) having a width of 1 to 300 mm, and more preferably 10 to 20 mm. The blank space is located at a position 1 to 300 mm inward of, and more preferably 10 to 20 mm inward of the outer edge of the back side of the decorative laminate, between the outer edge and the double-sided adhesive tape (2) for outer side. The blank space (3) is applied with elastic glue (1) in the form of straight line. The same elastic glue is also applied within each section of the sections partitioned by the double-sided adhesive tape (2) for inner side in the form of snaking line. Use of both the double-sided adhesive tapes and the elastic glue inhibit the decorative laminate from being peeled off a base material.

The double-sided adhesive tapes each are to temporarily attach the decorative laminate to the base material until the elastic glue is cured. The double-sided adhesive tape for use can be a wound type in which adhesive layers are provided to both sides of a support body and a release sheet is adhered onto one adhesive layer. Alternatively, the adhesive tape for use can consist of a single adhesive layer without a support body.

Examples of the support body are a paper, nonwoven fabric, a metal foil, woven fabric made of natural fiber, synthetic fiber, or the like, a resin film made from polyester, soft polyvinyl chloride, hard polyvinyl chloride, acetate, or the like, a polyolefin plastic film, such as PET (polyethylene terephthalate) and OPP (oriented polypropylene), flat yarn, plastic foam, or the like. Further, setting a thickness of the support body to 0.001 to 8.00 mm, and preferably 0.004 mm to 3.80 mm results in increase in the entire thickness of the double-sided adhesive tape without peeling off the support body when the decorative laminate is applied. This is desirable as an adhesion area for the elastic glue, which is described below, can be provided.

The adhesive layer preferably includes adhesive agent. An adhesive component that forms the adhesive agent can be acrylic-based resin, urethane-based resin, polyester-based resin, silicone-based resin, butyl rubber, epoxy-based resin. Notably, the acrylic-based resin is preferable from the view point of its handleability, advantage in adhesion, heat resistance, and water resistance, and cost. It is desirable to set a thickness of each adhesive layer to 0.001 to 3.00 mm, and more preferably 0.013 to 0.10 mm as these ranges provide advantage in adhesive strength of the adhesive layer without peeling off the adhesive layer when the decorative laminate is applied. Preferably, the entire thickness of the double-sided adhesive tape is 0.03 to 10 mm, and more preferably 0.1 to 4 mm. The double-sided adhesive tape, which has a thickness within these ranges, does not cause the adhesive agent to protrude and is capable of providing the adhesive area of the elastic glue described below. Here, the entire thickness is a sum of a thickness of the support body and a thickness of the adhesive layer and excludes a thickness the release sheet.

Particularly, the double-sided adhesive tape desirably has an adhesive strength of 3 to 30 N/20 mm, and more preferably 5 to 14 N/20 mm at a temperature of 23° C. according to 90-degree peel test based on JIS Z 0237. Alternatively, in a low-temperature environment (at a temperature of 0° C.), it is desirable that the adhesive strength is 1 to 20 N/20 mm, and more preferably 5 to 13 N/20 mm.

Further, the double-sided adhesive tape, which has an adhesive strength within the aforementioned ranges at a temperature of 23° C. or 0° C., is strong enough to support the decorative laminate itself (about 5.6 kg/m$^2$) in an environment at a temperature of 23° C. and in an environment at a temperature of 0° C. until the glue is initially cured. Therefore, it is possible to inhibit slippage or troubles, such as warpage and peeling, of the applied decorative laminate due to influence of working temperature. The double-sided adhesive tape, which has the aforementioned strength at a temperature of 23° C., surely enables the decorative laminate to be temporarily fixed to the base material in its application in a room temperature environment. The double-sided adhesive tape, which has the aforementioned strength at a temperature of 0° C., surely enables the decorative laminate to be temporarily fixed to the base material in its application during cold.

Further, it is desirable that the double-sided adhesive tape has the adhesive strength of 3 to 30 N/20 mm at a temperature of 23° C. and 1 to 20 N/20 mm in a low temperature environment (at a temperature of 0° C.). In these cases, the decorative laminate can be surely temporarily fixed to the base material in both the room temperature environment and the cold environment.

Preferably, in the present disclosure, the support body for the adhesive layer of the double-sided adhesive tape is a film made from polyethylene-based foamed resin or PET (polyethylene terephthalate). And, adhesive agent containing acrylic-based resin or butyl rubber is used for the adhesive layer.

In the present disclosure, the elastic glue is applied to the outer circumferential portion on the back side of the decorative laminate and to the inside of the sections formed in the inner portion of the decorative laminate inward of the outer circumferential portion.

The elastic glue is glue that has rubber elasticity after being cured. Examples of the elastic glue include modified silicone resin based, polyurethane resin based, polysulfide modified epoxy resin based, acrylic resin based, SBR (styrene-butadiene rubber based), and vinyl acetate resin based. The modified silicone resin-based glue is preferable due to its advantage in water resistance, durability, and adhesion, and followability to contraction and extension in dimensions of the decorative laminate, which is easily contracted and extended due to humidity and dryness. The elastic glue can be moisture-curable reactive adhesive agent.

Examples of the modified silicone resin-based elastic glue include moisture-curable solvent free one-component modified silicone resin-based elastic glue and solvent-based modified silicone resin-based elastic glue. The moisture-curable solvent free one-component modified silicone resin-based elastic glue reacts with moisture in the atmosphere and is then cured. Particularly, the moisture-curable solvent-free one-component modified silicone resin-based elastic glue can be applied thicker relative to the solvent-based modified silicone resin-based elastic glue and is environmentally preferable.

Preferably, the elastic glue is applied thicker relative to the double-sided adhesive tape. Specifically, the elastic glue has an application thickness of preferably 1 mm or more and 5 mm or less. An application thickness within these ranges provides sufficient adhesive effects and followability. As a result, the decorative laminate is pulled by the double-sided adhesive tape when being attached to the base material with pressure and consequently, the elastic glue and the decorative laminate are firmly adhered to each other. Further, the double-sided adhesive tape functions as a weir against the elastic glue. The elastic glue that is applied to the outer circumference portion of the decorative laminate is applied in the form of straight line for stable formation of an application surface of the decorative laminate after being applied.

Desirably, the elastic glue has the adhesive strength, specifically a tensile strength of 0.1 to 0.9 kN, and more preferably 0.2 to 0.73 kN against a metal jig, such as iron having a size of 40 mm×40 mm, using an adhesive strength testing machine in Building Research Institute Method (manufactured by Oxjack Co., Ltd.). According to these ranges of the tensile strength, it is possible to obtain sufficient adhesive effects and follow ability.

Figure 3:
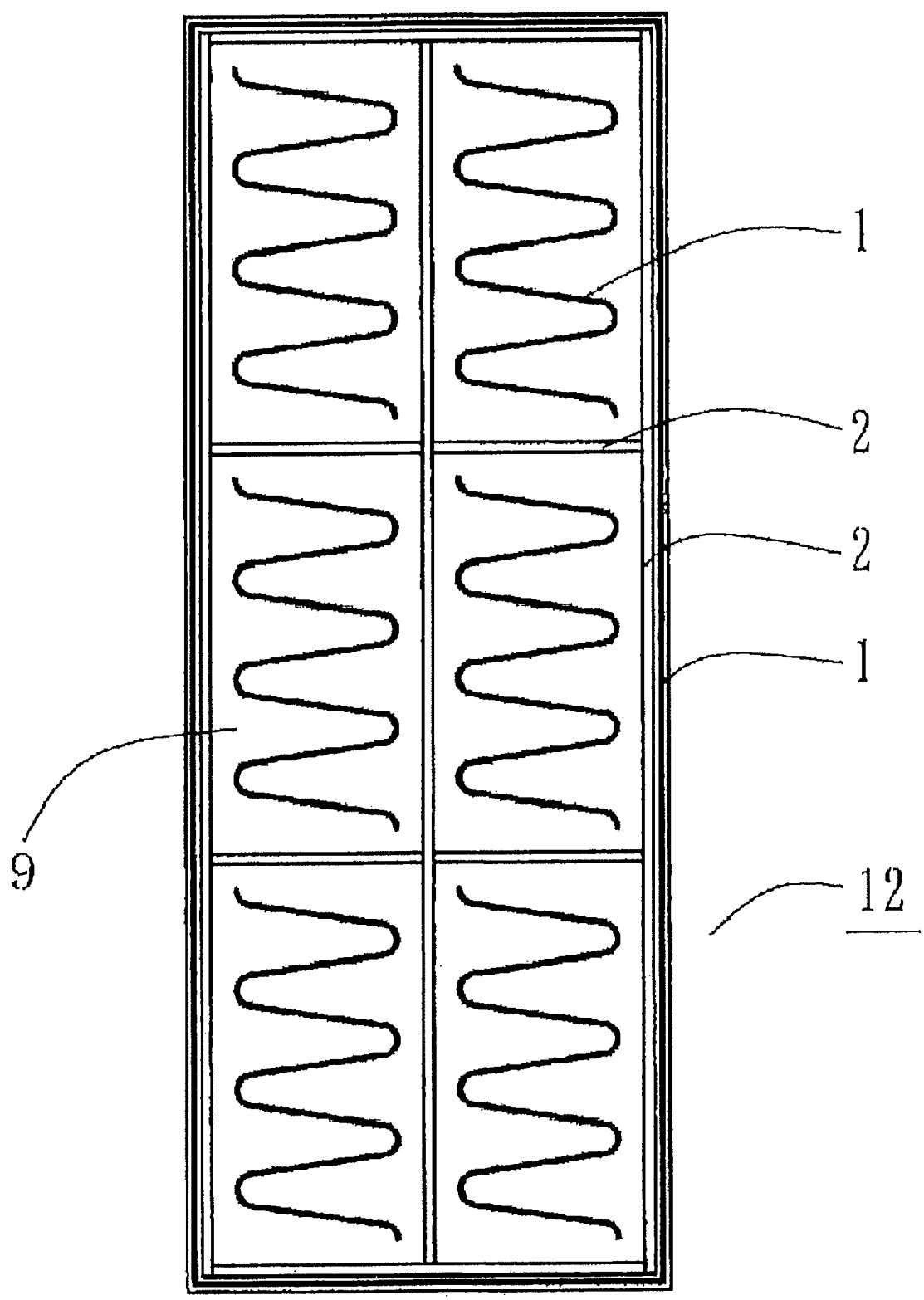
FIG. 3 is a plan view of a decorative laminate having six sections, the decorative laminate having double-sided adhesive tapes adhered to a back side thereof and elastic glue applied to the back side.

In FIG. 1, the sections formed by the double-sided adhesive tape for inner side include four sections. However, there is no limitation to the number of the sections. The sections are appropriately adjusted to six sections, eight sections, nine sections, or the like depending on the size of the decorative laminate. FIG. 3 is a plan view of the decorative laminate equally divided into six sections. As in FIG. 1, the elastic glue is applied to the outer circumferential portion of the decorative laminate in the form of straight line and the elastic glue is applied to the inside of the sections in the inner portion in the form of snaking line.

Figure 4:
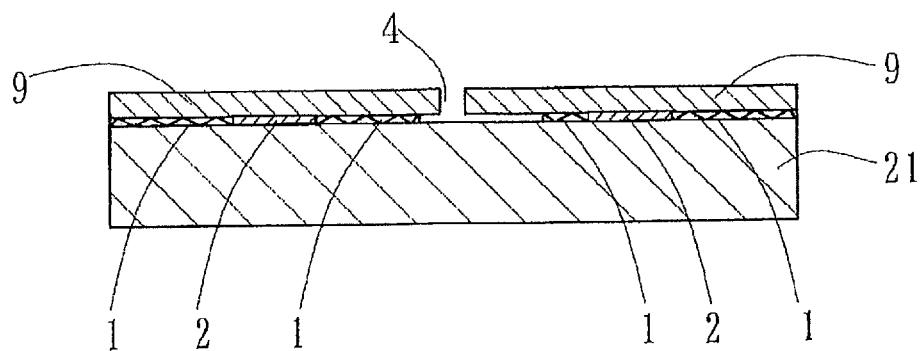
FIG. 4 is a sectional view of a configuration according to the present disclosure.

FIG. 4 is a sectional view of a configuration of an attachment configuration of decorative laminates in which gapping construction is performed on two decorative laminates (9, 9), which are then fixed to a base material (21). In the gapping construction, a joint (4) is formed between the two decorative laminates (9, 9) and the joint (4) includes the gap. The joint (4) created by the gapping construction is finished using a jointer, caulking agent, or a joint bottom tape to enhance visual quality of the gap.

Figure 5:
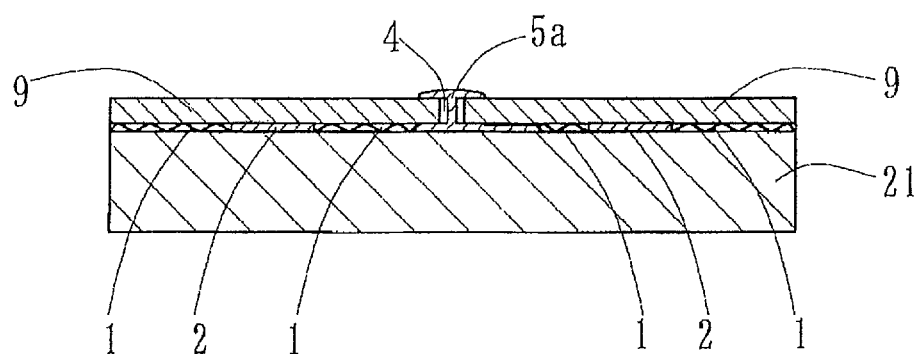
FIG. 5 is a sectional view of an attachment configuration of decorative laminates in which a joint portion is finished with a flat type jointer.

If the base material is planar as shown in FIG. 5, for example, a flat type jointer (5a) is used so that dust is not accumulated in the gap. The two decorative laminates (9, 9) are joined together via the flat type jointer and are fixed to the base material (21) while being spaced apart from each other. Use of the flat type jointer causes no problems in appearance of the decorative laminates and is therefore advantageous even if the decorative laminates are slightly extended and shrunk and/or an end of each decorative laminate is not in the form of straight line.

Figure 6:
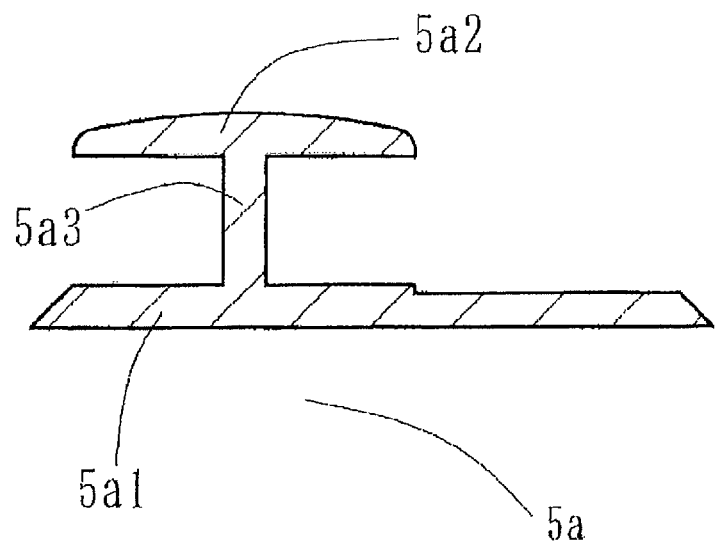
FIG. 6 is a sectional view of the flat type jointer of FIG. 5.

FIG. 6 is a sectional view of the flat type jointer (5a).

Figure 7:
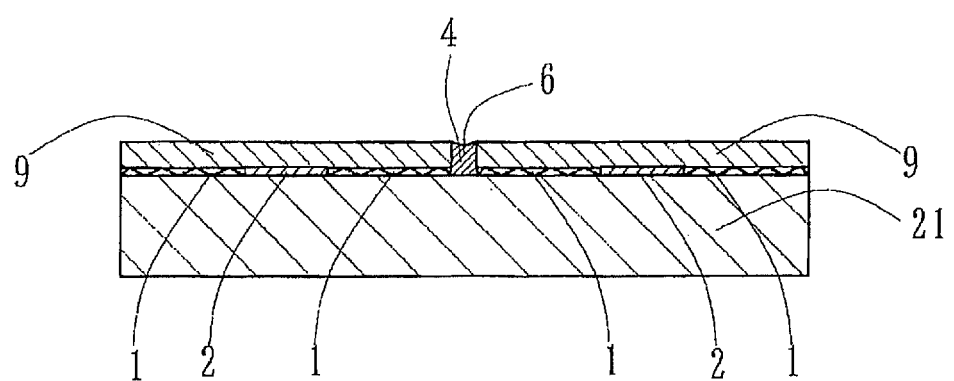
FIG. 7 is a sectional view of an attachment configuration of decorative laminates that is finished by filing the joint portion with caulking agent.

FIG. 7 is a sectional view of the attachment configuration of the decorative laminates in which caulking agent (6) is applied to the joint (4). The two decorative laminates (9, 9) are fixed to the base material (21) and the joint (4) is filled with the caulking agent (6). As for the caulking agent, silicone resin-based caulking agent is particularly recommended, which easily follows a dimensional change of the decorative laminate and is advantageous in water resistance.

Figure 8:
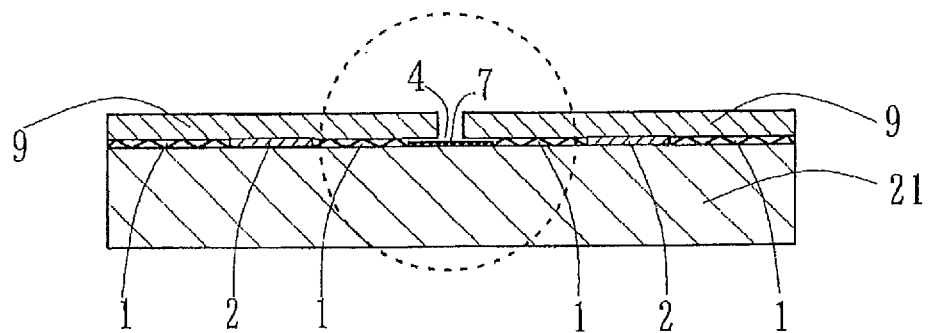
FIG. 8 is a sectional view of an attachment configuration of decorative laminates that is finished by adhering a joint bottom tape to the joint portion.
Figure 9:
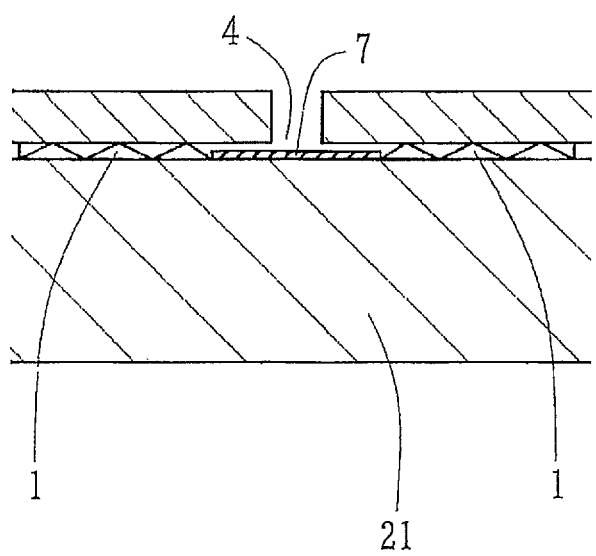
FIG. 9 is an enlarged sectional view of a main part showing a portion enclosed by a dotted line in FIG. 8.

FIG. 8 is a sectional view of the attachment configuration of the decorative laminates in which the joint (4) is applied with the joint bottom tape (7). FIG. 9 is a sectional view of a main part of FIG. 8. The two decorative laminates (9, 9) are fixed to the base material (21) and the joint (4) has the joint bottom tape (7) adhered thereto so that the base material (21) is not exposed. The joint bottom tape (7) can be easily attached by using a thin decorative tape, particularly a decorative tape that includes an adhesive layer on its back side.

Accordingly, descriptions have been made to the attachment configuration of the decorative laminates of the present disclosure, in which the decorative laminates are applied to the base material on the same plane. Application of the attachment configuration of the decorative laminates of the present disclosure is not limited to a plane of the configuration that has an outer surface or an inner surface extending in a planar manner, to which the decorative laminates are applied. The attachment configuration of the decorative laminates of the present application can be advantageously applied in treating an external and/or an internal corner. The external corner is a corner between outer surfaces of planes of the configuration, to which the decorative laminates are applied, in other words, a place of intersection along which the outer surfaces extend. The internal corner is a corner between inner surfaces of the planes.

Figure 10:
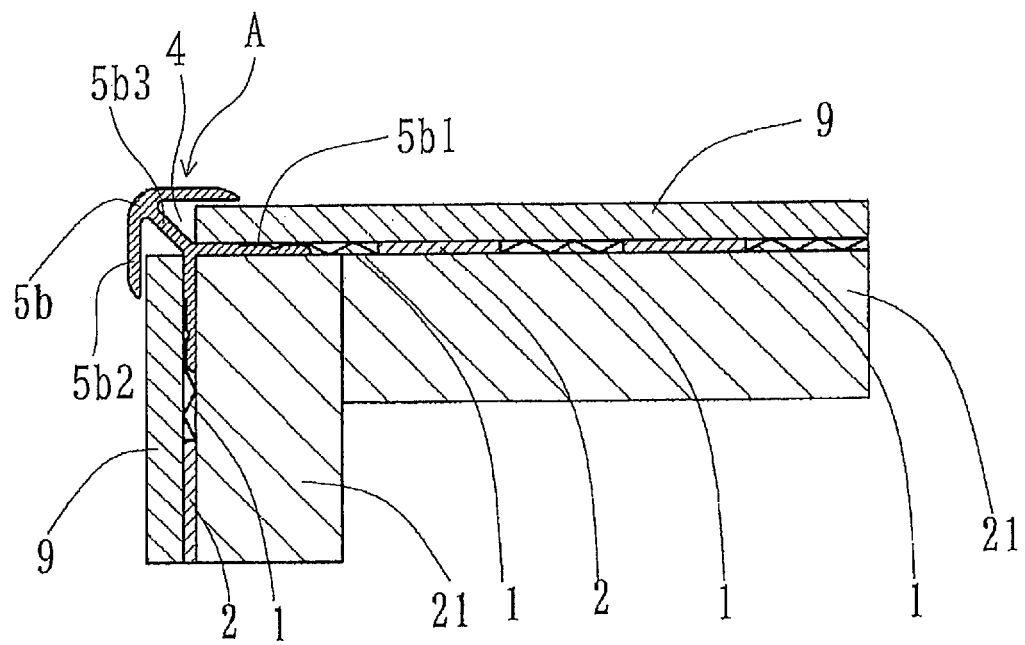
FIG. 10 is a sectional view of an attachment configuration of decorative laminates at an external corner using a jointer of arrow head type for external corner.
Figure 11A:
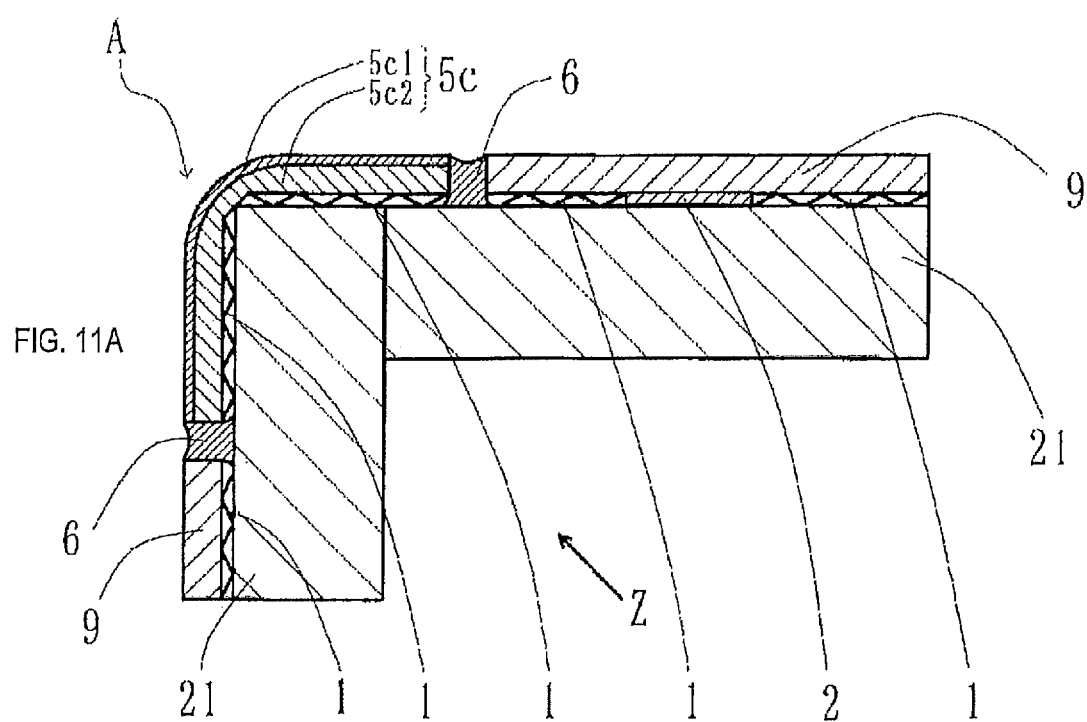
FIG. 11A is a sectional view of an attachment configuration of decorative laminates at the external corner using a jointer of L-letter type for external corner.
Figure 12:
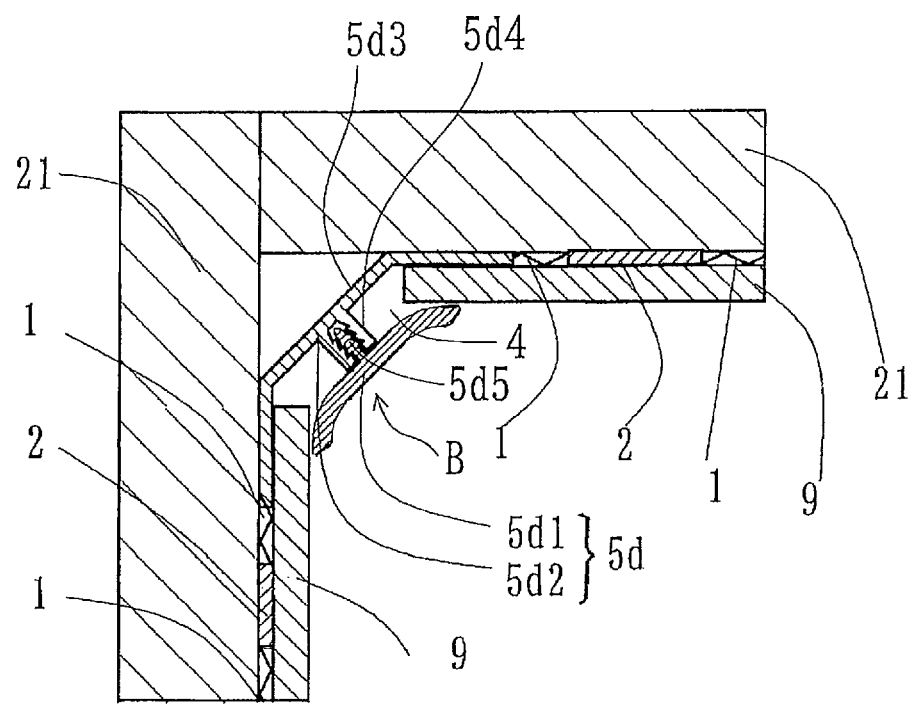
FIG. 12 is a sectional view of an attachment configuration of decorative laminates that is finished using a jointer of fit type for internal corner.
Figure 13:
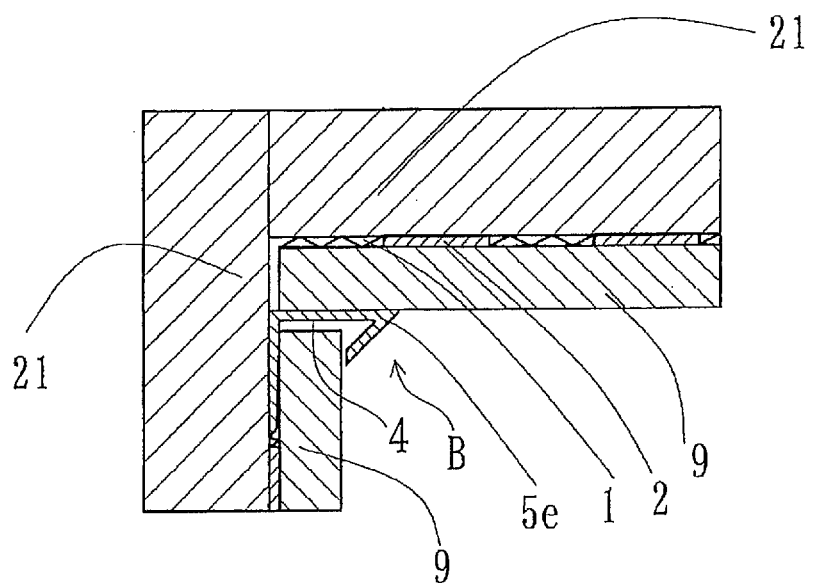
FIG. 13 is a sectional view of an attachment configuration of the decorative laminates at an internal corner using a jointer of L-letter type for internal corner.

For example, FIG. 10 is a sectional view of the attachment configuration of the decorative laminates at the external corner using a jointer of arrow head type for external corner (5b). FIG. 11A is a sectional view of the attachment configuration of the decorative laminates at the external corner using a jointer of L-letter type for external corner (5c). FIG. 12 is a sectional view of an attachment configuration of the decorative laminates at the internal corner using a jointer of fit type for internal corner (5d). FIG. 13 is a sectional view of an attachment configuration of the decorative laminates at the internal corner using a jointer of L-letter type for internal corner (5e). The shape of jointer is not limited to the aforementioned shapes. The shape and the color of jointer can be appropriately selected depending on where the decorative laminate is attached. The material of jointer is, for example, aluminum or resin Descriptions are given to an application method for obtaining the attachment configuration of the decorative laminates of the present disclosure, which is achieved by including the following steps of:

(A) cutting a first decorative laminate of at least paired two decorative laminates into a desired size using a member that has a rectangular shape in a plan view, the member including a difference for one step in height and being provided with an upper planar portion, a lower planar portion and a side wall;

(B) adhering the double-sided adhesive tapes to a back side of the first decorative laminate obtained in the cutting (A) and applying the elastic glue to several portions of the first decorative laminate on the back side;

(C) attaching a vacuum lifter itself to a front surface of the first decorative laminate obtained in the adhering (B) and pressing the back side toward the base material to fix the first decorative laminate to the base material; and (D) treating a second decorative laminate of the at least paired two decorative laminates in the same manner as in the steps (A), (B), and (C) and fixing the second decorative laminate to the base material with a distance made between the first decorative laminate and the second decorative laminate.

Figure 14:
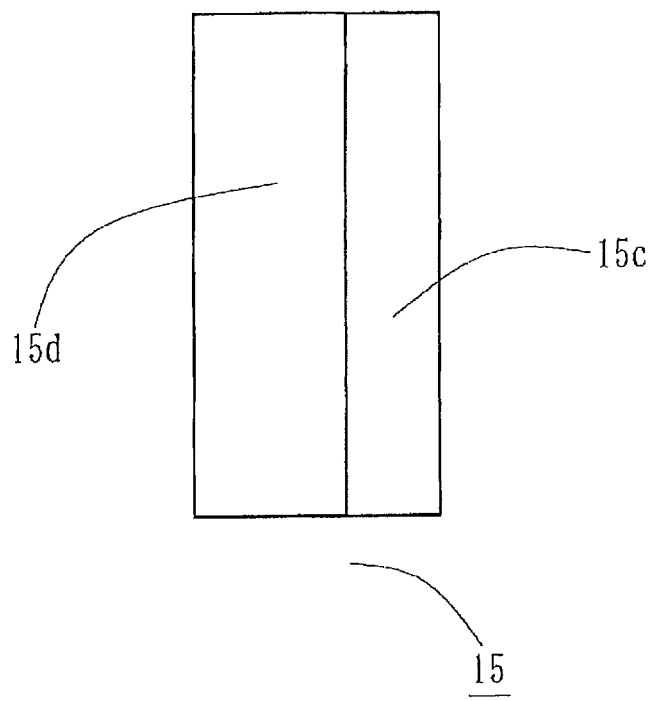
FIG. 14 is a plan view of a stepped member related to the present disclosure.
Figure 15:
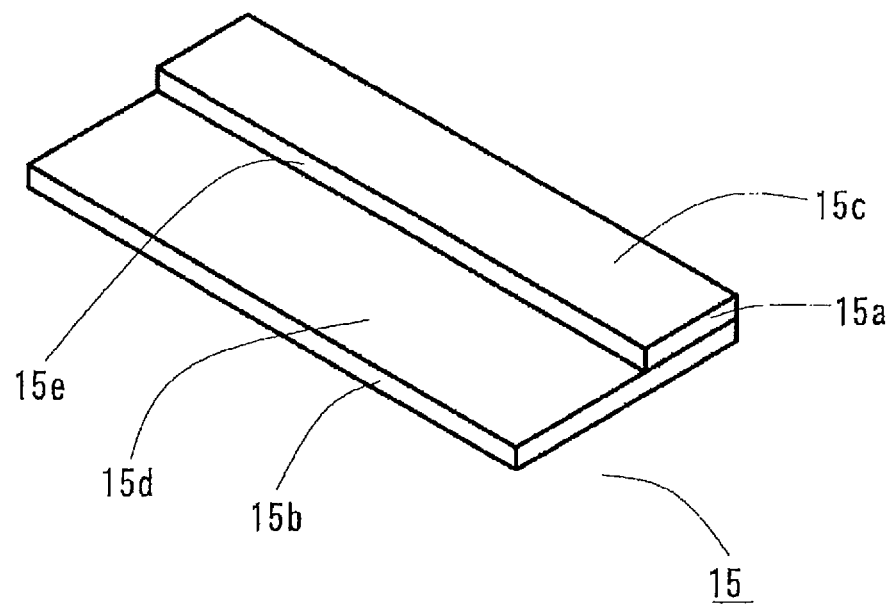
FIG. 15 is a perspective view of the stepped member related to the present disclosure.
Figure 16:
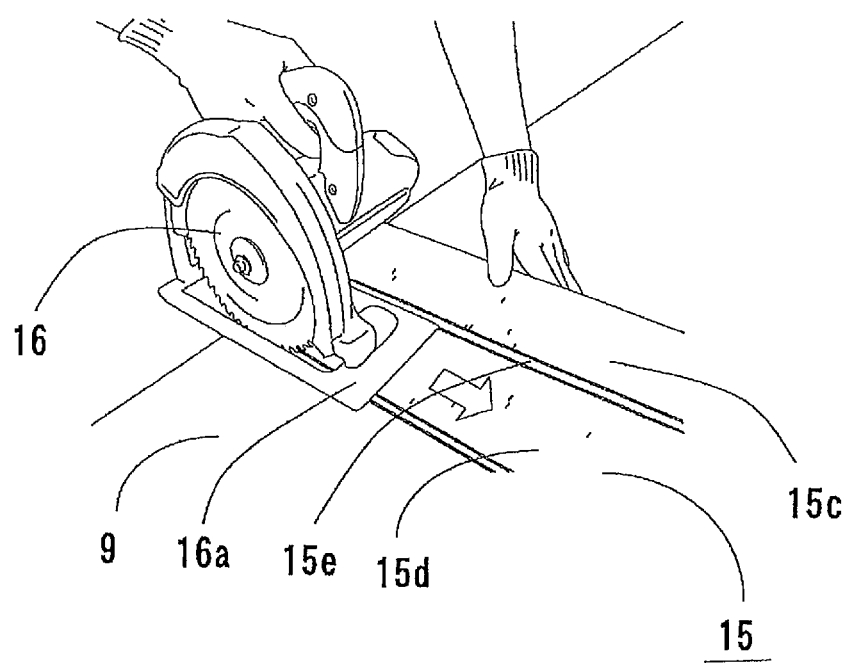
FIG. 16 is an explanatory diagram for explanation of a step (A) according to the present disclosure.

FIG. 14 is a plan view of the member (15) having the rectangular shape in a plan view, the stepped member including the difference for one step in height and being provided with the upper planar portion (15c), the lower planar portion (15d), and the side wall (15e) in a longitudinal direction (hereinafter referred to as a stepped member). The stepped member (15) is continuous in up-down directions in the plan view. FIG. 15 is a perspective view of the stepped member (15). The stepped member includes the difference for one step in height in order to bring a blade guide (16a) of an electric circular saw (16), which is described below, into abutment with the side wall (15a) created by the difference for one step in height. Such a difference of the stepped member plays an important role to cut the decorative laminate and enhance precision of the straight line. The stepped member (15) is obtained by joining a first board body (15a) and a second board body (15b) with each other. The first board body and the second board body have respective different widths. When joining, one end surface of the first board body (15a) and one end surface of the second board body (15b) are flush with each other, thereby making it easy to support the stepped member with one hand as shown in FIG. 16. Example materials of the stepped member include a plastic laminated board and a plywood. However, there is no limitation to a material of the stepped member. There is also no limitation to a method of joining the first and second board bodies. The first board body and the second board body each can have any width that falls within a range of about 300 to 450 mm, and any thickness that falls within a range of about 3 to 12 mm. Preferably, lengths of the first board body and the second board body are equal to or greater than a size of the decorative laminate to be cut.

In the step (A), the first decorative laminate of the at least paired two decorative laminates is cut into a desired size. In cutting the decorative laminate into the desired size, the electric circular saw (16) is placed on the lower planar portion (15d) as shown in FIG. 16. The blade guide (16a) of the electric circular saw is brought into abutment with the side wall (15e). The upper planar portion (15c) is held with one hand while the electric circular saw is slid along the side wall (15e) with the other hand such that a blade (16b) protrudes out of the stepped member (15), thereby cutting the decorative laminate. Desirably, a width (w) of the lower planar portion (15d) is the same as a distance (L) from an end surface facing the blade (16b) of the blade guide (16a) of the electric circular saw (16) to the blade (16b). The step (A) enables quick obtainment of the desired first decorative laminate that is advantageous in precision of the size. In addition, a cut surface is finished in the form of straight line, which is advantageous in the gapping construction and fitting of the jointer described below.

Figure 18:
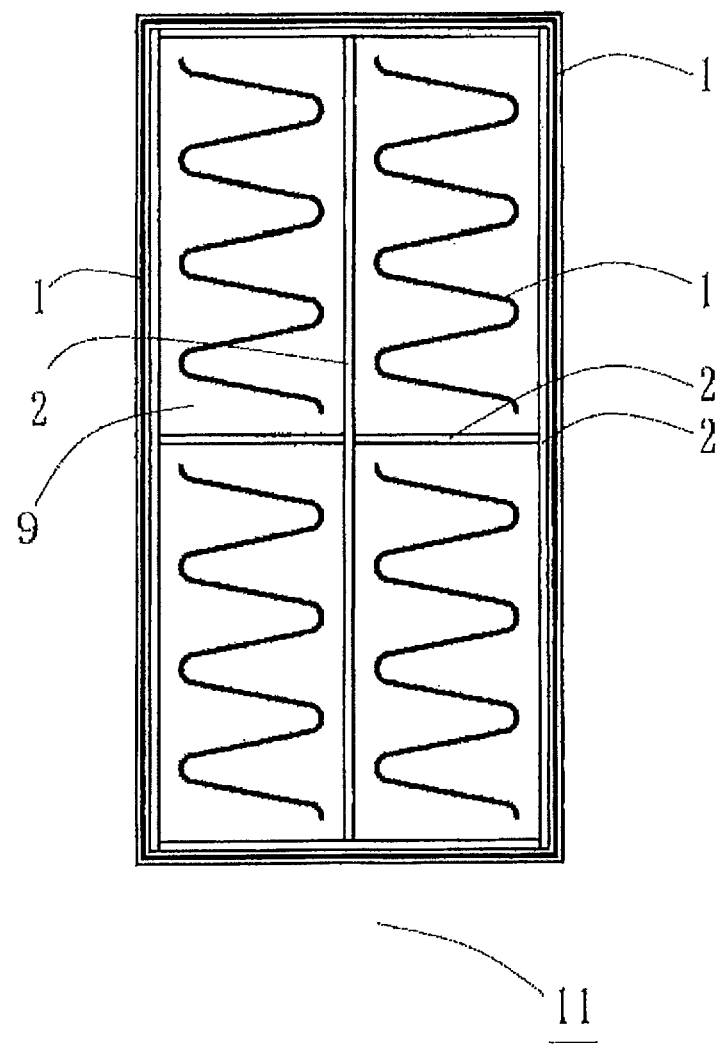
FIG. 18 is a plan view of the decorative laminate for explanation of a step (B) according to the present disclosure.
Figure 19:
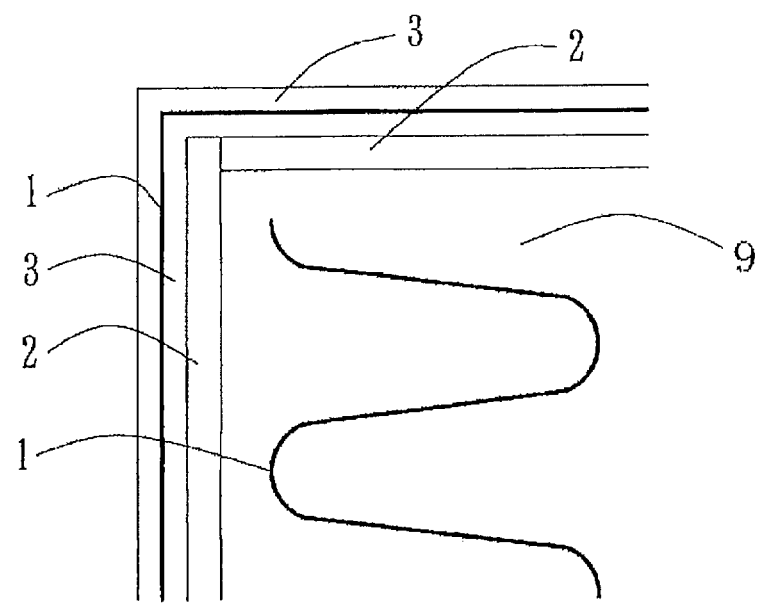
FIG. 19 is an enlarged plan view of a main part of FIG. 18.

FIG. 18 and FIG. 19, which show the step (B), are identical to the above-described FIG. 1 and FIG. 2 respectively. Preferably, the elastic glue (1) is applied in the form of straight line when applied to the outer circumferential portion of the back side of the decorative laminate. Also, the elastic glue (1) is applied to places (inside of the sections) defined by the double-sided adhesive tapes in the inner portion on the back side of the decorative. In this case, examples of a usable method of applying glue include dot coating in which glue is applied at fixed intervals (referred to as rounded ball pasting); a so-called scratching in which glue is applied using a metal plate having a comb-shaped leading end, and application in the form of snaking line in which glue contained in a cartridge is extruded for application in the form of snaking line as shown in FIG. 19. Among these methods, it is preferable to apply the glue in the form of snaking line. According to application in the form of snaking line, it is possible to gain greater adhesive area relative to an area of the decorative laminate and exhibit the adhesive strength over the entire decorative surface. Also, it is possible to efficiently and quickly apply the glue.

Descriptions are given to the step (C). The decorative laminate, to which the double-sided adhesive tapes (2) are adhered and the elastic glue (1) is applied in the step (B), is attached to the vacuum lifter as shown in FIG. 21. The vacuum lifter is, for example, a glass vacuum lifter shown in FIG. 20. The decorative laminate is temporarily fixed to the base material with the double-sided adhesive tapes and is thereafter pressed against the base material. The vacuum lifter can be any vacuum lifters that attach itself to the decorative laminate. For example, the glass vacuum lifter is preferable. The glass vacuum lifter is used in applying a glass board to an application target and is also suitable for use in application of the decorative laminate. Desirably, the glass vacuum lifter has the maximum lifting capacity of 5 to 600 kg, and more preferably 30 to 350 kg. These ranges of the lifting capacity enable the decorative laminate to be applied without being damaged on its surface while the vacuum lifter keeps an attaching strength for attaching itself to the decorative laminate. Also, use of suction cups enables the application to be advantageous in precision of an attachment position of the decorative laminate.

Figure 20:
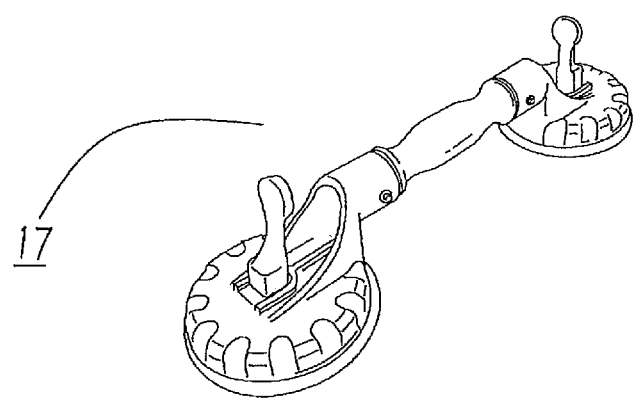
FIG. 20 is a perspective view of a glass vacuum lifter used for a step (C) according to the present disclosure.
Figure 21:
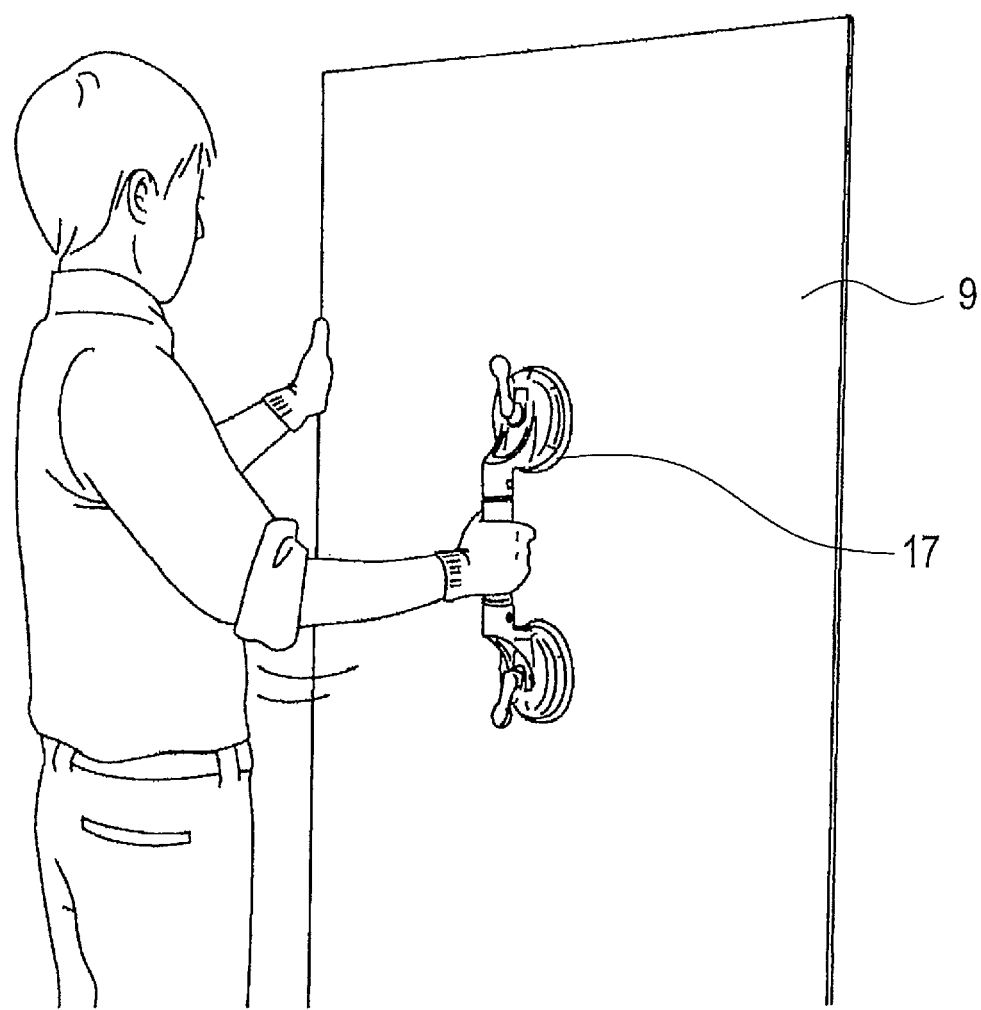
FIG. 21 is an explanatory diagram showing how work is performed using the glass vacuum lifter.

The glass vacuum lifter (17) of FIG. 20 has two suction cups. However, the number of suction cup is not limited to two. The glass vacuum lifter with the appropriate number of suction cup is selected depending on the size and the weight of the decorative laminate to be attached.

In the step (D), the second decorative laminate of the paired two decorative laminates is also pressed against the base material in the same manner as in the case of the first decorative laminate. The second decorative laminate is applied to the base material having a distance from the first decorative laminate (gapping construction). The paired two decorative laminates are spaced apart from each other because, even if an error occurs in width of the joint, the presence of space can make the error invisible or unnoticeable by a method of finishing described below. In contrast, in butting construction in which paired two decorative laminates are applied without a space, a joint is easily cracked due to contraction and extension in dimensions of the decorative laminates; a gap is created between the decorative laminates, which results in degradation in visual quality; the decorative laminates thrust up at the joint thereof due to stretch of the decorative laminates affected by the environment, which results in fall of the decorative laminates off the base material; and the application requires a highly developed level of skill and time. For these reasons, the butting constructions is unpreferable. Preferably, the paired two decorative laminates have a gap of 2 to 4 mm therebetween.

Figure 22:
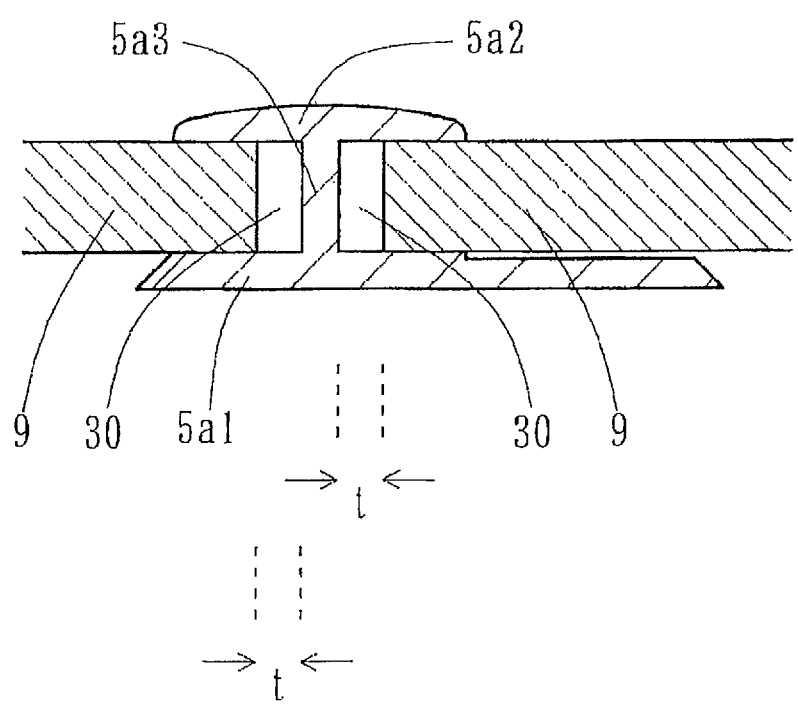
FIG. 22 is an enlarged sectional view of a main part of FIG. 5.

The joint, which includes a gap formed by spacing the paired two decorative laminates apart, can be applied with the jointer on the base material after the jointer is inserted into ends of the decorative laminates or in a manner such that the jointer is laid in advance. During the gapping construction, in order to provide the joint with more uniform width, it is preferable to place a plate-shaped body having a width of about 3 to 5 mm as a spacer in a location to be the joint and use the plate-shaped body as a support to provide the joint with a precise width. When the paired two decorative laminates are spaced apart (gapping), the width of the joint is set to be 3 mm or more. When the paired two decorative laminates are finished with the jointer, it is desirable, as shown in FIG. 22 for example, to provide a gap (30) between the end surface of each decorative laminate (9) and the jointer to be adjustable to contraction and extension of the decorative laminate (9). In this case, the width (t) of the gap is 1.0 to 3.5 mm, and more preferably 1.5 to 3.0 mm. If the decorative laminates, each of which has no gap from the jointer, are stretched due to influence of temperature and humidity, a stress is exerted toward the jointer but cannot be released out. The stress is repelled and applied inwardly, which causes the decorative laminates to uplift and consequently damages the decorative laminates in some cases.

Preferably, the base material, to which the decorative laminate is applied, is an inorganic base material, a wooden base material, or an organic base material, for example. Examples of the inorganic base material include a metal board, tile, a cement board, a volcanic vitreous multi-layer board, a calcium silicate board, a magnesium silicate board, a magnesium oxide board, and a plaster board.

Examples of the wooden base material include, a plywood, an insulation board, a MDF (Medium Density Fiberboard), a hard board, a particle board, and an oriented strand board.

Examples of the organic base material include a plastic board, such as of thermosetting resin based or thermoplastic resin based. Specific examples include a phenol resin board, a polycarbonate board, an acrylic resin board, a hard vinyl chloride board, a soft vinyl chloride board, a polypropylene resin board, a polystyrene resin board, and a polyethylene terephthalate (PET) resin board.

Particularly, if the base material and the double-sided adhesive tapes or the elastic glue are not adhered to each other well, a primer may be used to treat the base material. Examples of the primer include acrylic based, urethane based, polyester based, silicone based, butyl rubber based, and epoxy based. In the present disclosure, if the base material is a calcium silicate board, a plywood, or mortar, a polyurethane resin-based primer or an acrylic resin primer is used in advance of the step (A) in order to enhance the strength of the elastic glue.

The decorative laminate to be applied to the base material is advantageously a thermosetting resin decorative laminate that includes a decorative layer and a core layer. This is because the thermosetting resin decorative laminate is advantageous in wear resistance, strength, and heat resistance. As the core layer of the thermosetting resin decorative laminate, a thermosetting resin-impregnated kraft paper can be used. The core layer can also be configured with a prepreg containing a fibrous base material, an organic binder component, and an inorganic filler. Preferable is a prepreg that is formed by impregnating the inorganic fibrous base material with a slurry containing a binder component and an inorganic filler and by drying. This is because such a prepreg provides the decorative laminate with non-combustibility.

Examples of the inorganic fibrous base material used for the prepreg for the non-combustible decorative laminate include a nonwoven fabric and woven fabric made from inorganic fiber, such as glass fiber, rock wool, carbon fiber, and ceramic fiber. Preferably, the basis weight of the inorganic fibrous base material is within a range of 10 to 200 g/m². In particular, it is preferable to use glass fiber nonwoven fabric that is advantageous in heat resistance and flame resistance.

The binder component contained in the slurry includes an organic resin component. Examples of the organic resin component include thermosetting resin, such as phenol-formaldehyde resin and melamine-formaldehyde resin, thermoplastic resin emulsion, such as acrylic resin emulsion, vinyl chloride resin emulsion, or the combination thereof.

As the inorganic filler, it is preferable to use endothermic metal hydroxide and/or an inorganic substance other than the endothermic metal hydroxide.

The endothermic metal hydroxide contains water of crystallization. The endothermic metal hydroxide decomposes at a high temperature and absorbs heat to release the water of crystallization, which therefore enhances non-combustibility of the decorative laminate. Examples of the endothermic metal hydroxide include aluminum hydroxide, magnesium hydroxide, and calcium hydroxide. An average particle diameter of the endothermic metal hydroxide can be set to be within a range of, for example, 1 to 50 µm. This average particle diameter is an arithmetic average diameter that is calculated using the particle size distribution (volume distribution) detected by a laser diffraction/scattering method (Microtrac method). Due to the average particle diameter of the endothermic metal hydroxide being within the aforementioned range, dispersibility of the endothermic metal hydroxide in the slurry and thus the impregnation properties of the slurry into the fibrous base material are improved.

Examples of the inorganic substance other than the endothermic metal hydroxide include carbonate, such as calcium carbonate, magnesium carbonate, and zinc carbonate, silica, talc, and fly ash. An average particle diameter of the inorganic substance (the arithmetic average diameter calculated using the particle size distribution (volume distribution) detected by the laser diffraction/scattering method (Microtrac method)) can be set to be within a range of, for example, 0.05 to 20 µm. In this case, the impregnation properties of the slurry into the inorganic fibrous base material is further improved.

In particular, it is preferable to select carbonate (for example, calcium carbonate). In this case, workability and machinability are further improved during production process of the decorative laminate. Example of the calcium carbonate for use include heavy calcium carbonate and light calcium carbonate (precipitated calcium carbonate). An average particle diameter of the calcium carbonate can be set to be, for example, 0.05 to 10 µm, and more preferably 1 to 5 µm. Due to the average particle diameter of the calcium carbonate being 0.05 µm or more, the calcium carbonate is unlikely to be aggregated in the slurry, which thus improves the impregnation properties of the slurry into the fibrous base material. In addition, due to the average particle diameter of the calcium carbonate being 10 µm or less, the decorative laminate has an even smoother surface, which thus improves appearance of the decorative laminate.

Preferably, the slurry has an impregnation rate (%) within a range of 700 to 1200% into the inorganic fibrous base material using a calculation method shown in Formula 1. In Formula 1, the term "weight after impregnation" means a weight of the inorganic fibrous base material after the inorganic fibrous base material is impregnated with the slurry and dried. The term "weight before impregnation" means a weight before impregnation with the slurry and drying, that is, a weight of the inorganic fibrous base material. The impregnation rate of 1200% or less of the slurry can reduce fall-off of the solid content of the slurry from the prepreg and thus makes the prepreg easy to handle. The impregnation rate of 700% or more of the slurry causes less separation between layers of the prepreg.

$$\text{Impregnation rate} \atop (\%) = \frac{\text{Weight after impregnation} - \text{Weight before impregnation}}{\text{Weight before impregnation}} \times 100 \quad \text{Formula 1}$$

The blending ratio of the organic resin component in the slurry to the inorganic filler comprising the endothermic metal hydroxide and/or the inorganic substance other than endothermic metal hydroxide by solid weight is desirably 1:1-25, and more preferably 1:5-20. Due to the blending ratio of the organic resin component to the inorganic filler is within these ranges, adhesion between the decorative layer and the prepreg and/or between prepregs can be improved. Moreover, non-combustibility of the decorative laminate can be improved.

Preferably, the organic resin component contained in a piece of prepreg is 30 to 100 g/m² and the organic resin component contained in the core layer is 40 to 500 g/m². The organic resin component within these ranges provides the decorative laminate, which uses the prepreg, with advantage in non-combustibility. Moreover, adhesion between the decorative layer and the prepreg and/or between prepregs becomes advantageous.

Either one of the inorganic substance other than the endothermic metal hydroxide or the endothermic metal hydroxide can be independently used or the inorganic substance other than the endothermic metal hydroxide and the endothermic metal hydroxide can be used in combination. In the combined use, it is preferable that the blending ratio of the endothermic metal hydroxide is 0.2 to 20 part by weight, and more preferably 0.5 to 15 part by weight relative to 1 part by weight of the inorganic substance other than the endothermic metal hydroxide. This is because the blending ratio of the endothermic metal hydroxide within these ranges provides flat and satisfactory appearance of the surface of the decorative laminate. Further, the blending ratio of 0.2 part by weight or more of the endothermic metal hydroxide provides the decorative laminate with advantageous non-combustibility. The blending ratio of 20 part by weight or less of the endothermic metal hydroxide inhibits the endothermic metal hydroxide in the slurry from being precipitated, which consequently facilitates control of the impregnation amount of the slurry. The blending ratio of 20 part by weight or less of the endothermic metal hydroxide can reduce wear of a cutter used for cutting the decorative laminate.

As for the above-described inorganic filler, it is particularly preferable to use three types of inorganic fillers that include the inorganic substance other than the endothermic metal hydroxide and/or the endothermic metal hydroxide and that have respective different average particle diameters.

The three types of inorganic fillers having the respective different average particle diameters comprise a small particle diameter inorganic filler, a medium particle diameter inorganic filler, and a large particle diameter inorganic filler. The small particle diameter inorganic filler is 0.04 µm or more and less than 4 µm. The medium particle diameter inorganic filler is 4 µm or more and less than 12 µm. The large particle diameter inorganic filler is 12 µm or more and less than 50 µm. These three types of inorganic fillers may be the same substance or difference substances. The blending ratio of the small particle inorganic filler to the medium particle diameter inorganic filler to the large particle diameter inorganic filler in the slurry is preferably 1:0.1 to 20:0.1 to 20, and more preferably 1:0.1 to 10:0.1 to 10. In these cases, the decorative laminate that is advantageous in both smoothness and non-combustibility can be obtained.

The reason for advantage in smoothness is considered to be as follows. The inorganic filler is considered to be uniformly dispersed on the surface of the nonwoven fabric or to have entered gaps between fibers of the nonwoven fabric. Specifically, the nonwoven fabric is an aggregate of fibers in which short fibers of the nonwoven fabric are dispersed one by one and entwined with a binder component, by thermal melting, or mechanically. The nonwoven fabric is more porous than a kraft paper used as a core paper for usual decorative laminates, thus having sparse parts, which are so-called voids. Such voids are not uniform in size. The voids are filled with the above-described inorganic fillers having the respective different average particle diameters. By doing so, the inorganic fillers, which have the respective different average diameters, enter the voids formed in the nonwoven fabric in various sizes. As a result, the inorganic fillers can be uniformly dispersed on the nonwoven fabric or enter gaps between fibers of the nonwoven fabric. In particular, thermoplastic resin emulsion easily softens as compared with the thermosetting resin contained in the slurry. Thus, when the thermosetting resin emulsion is used as the binder component in the fleece forming process of the nonwoven fabric, binding of the entangled fibers is weakened. For this reason, the inorganic filler easily enters the voids in the nonwoven fabric during pressing such as hot pressing, gathers densely to the voids, and fills the voids. As a result, smoothness of the finished decorative laminate is improved.

When the three types of inorganic fillers are mixed together, the volume cumulative particle diameters Dv(10), Dv(50), and Dv(90) of the inorganic filler according to a laser diffraction/scattering-type particle size distribution measurement method are preferably 0.5 µm or more and 40.0 µm or less, and more preferably 0.78 µm or more and 36.9 µm or less. When the volume cumulative particle diameters of the inorganic filler containing three types of inorganic fillers are within these ranges, dispersibility of the inorganic filler into slurry is good, the voids in the nonwoven fabric are densely filled, and smoothness of the decorative laminate is improved.

Further, when the three type of inorganic fillers are mixed together, the specific surface area according to the laser diffraction/scattering-type particle distribution measurement method is preferably 800 to 4000 m²/kg, and more preferably 900 to 3500 m²/kg. When the specific surface area of the mixed inorganic filler is within these ranges, the inorganic filler easily absorbs thermosetting binder in the slurry. While the binder flows, the inorganic filler, in which the binder is absorbed, enters the voids in the nonwoven fabric, thus contributing improved adhesion between the prepregs. As described so far, selection of the inorganic filler having appropriate particle diameter according to the thickness and density of the nonwoven fabric to be used results in a decorative laminate having advantageous smoothness and sufficient adhesion as compared with conventional ones.

When the three type of inorganic fillers are used, it is particularly preferable that the small particle diameter inorganic filler is calcium carbonate. The calcium carbonate is unlikely to be aggregated in the slurry, which thus improves impregnation properties of the slurry into the fibrous base material. And, the decorative laminate has an even smoother surface, which results in improvement in appearance of the decorative laminate. In addition, the calcium carbonate is available inexpensively and is therefore preferable.

The thickness of the decorative laminate is preferably 0.50 mm to 8.00 mm, and more preferably 0.86 to 3.40 mm. The decorative laminate having the thickness within these ranges is inhibited from being warped, is preferable in its handleability, and is advantageous in applicability.

EXAMPLE 1

Paired two decorative laminates were prepared. One decorative laminate of the paired two decorative laminates is a first decorative laminate and the other decorative laminate is a second decorative laminate. Each of the paired two decorative laminates is a melamine decorative laminate. The melamine decorative laminate comprises: a decorative layer made of a melamine resin-impregnated paper; and a core layer made of a phenol resin-impregnated paper. Hereinafter, descriptions are given to a method of producing the melamine decorative laminate.

Preparation of Melamine Decorative Laminate
Production of Melamine Resin-Impregnated Decorative Paper A decorative paper in a wood grain pattern was impregnated with resin liquid mainly composed of melamine-formaldehyde resin such that the impregnation rate as defined by Formula 1 was 130% and was then dried to obtain a melamine resin-impregnated decorative paper.

Production of Phenol Resin-Impregnated Paper

A kraft paper having the basis weight of 187 g/m$^2$ was impregnated with resin liquid mainly composed of phenol-formaldehyde resin such that the impregnation rate as defined by Formula 1 was 50% and was then dried to obtain a phenol resin-impregnated core paper.

Production of Melamine Decorative Laminate

Figure 17:
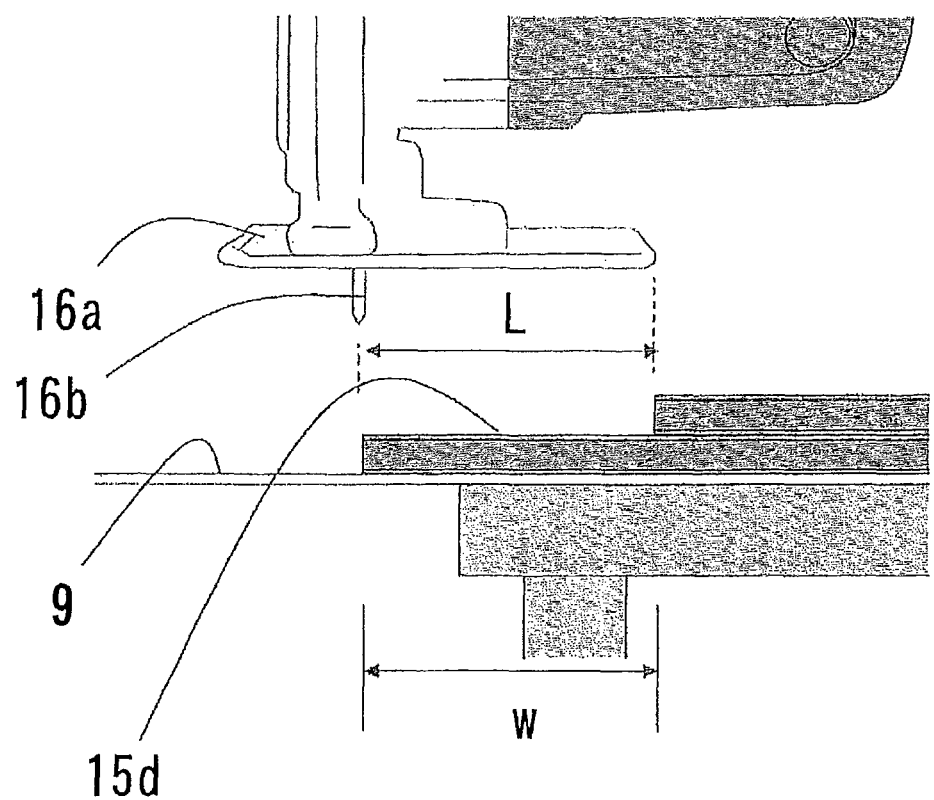
FIG. 17 is an explanatory diagram for explanation of the step (A) according to the present disclosure.

A melamine decorative laminate was obtained by stacking five sheets of phenol resin-impregnated core papers and one sheet of the melamine resin-impregnated decorative paper in this order from the bottom to produce a stacked body and forming the stacked body under heat and pressure. Polywoods were used as the first board body and the second board body. The polywood as the first board body has a width of 300 mm, a length of 1000 mm, and a thickness of 6 mm. The polywood as the second board body has a width of 450 mm, a length of 1000 mm, and a thickness of 6 mm. As shown in FIGS. 14 and 15, these polywoods were adhered to each other with rubber-based glue such that one end of the first board body and one end of the second board body are flush with each other, creating a difference for one step in height between the first and second board bodies to obtain the stepped member (15) that includes the upper planar portion (15*c*), the lower planar portion (15*d*), and the side wall (15*e*) extending in the longitudinal direction. Here, the lower planar portion shown in FIG. 17 had a width (W) of 150 mm, which is calculated by deducting the width of the first board body (300 mm) from the width of the second board body (450 mm). The length (L), which is from an end surface facing the blade (16*b*) of the electric circular saw (16) to the blade (16*b*), was also 150 mm.

The first decorative laminate, which is one of the paired two decorative laminates, were cut into a width of 935 mm and a length of 1855 mm using the stepped member and the electric circular saw according to the above-described procedures.

The double-sided adhesive tape (2) for outer side was adhered to the outer circumferential portion on the back side of the cut first decorative laminate, particularly at a position 30 mm inward of the outer edge as shown in FIG. 1. The double-sided adhesive tape (2) for inner side was adhered to the inner portion in the back side of the first decorative laminate, which is inward of the double-sided adhesive tape (2) for outer side, such that equally divided four sections are formed. The double-sided adhesive tape (2) for outer side and the double-sided adhesive tape (2) for inner side each are an acrylic double-sided adhesive tape A that has the entire thickness of 1 mm. The acrylic double-sided adhesive tape A comprises, as the support body, a polyethylene-based foamed resin body that has a thickness of 0.80 mm and a width of 20 mm. An adhesive layer on each side of the acrylic double-sided adhesive tape A has a thickness of 0.10 mm.

Then, the elastic glue (1) was applied to the back side of the first decorative laminate at a position 15 mm inward of the outer edge in the form of straight line such that a thickness of the elastic glue is 3 mm, and the same elastic glue was applied in the form of snaking line within the sections such that a thickness of the elastic glue (1) is 3 mm, to thereby obtain the first decorative laminate for application to a base material. As the elastic glue, the moisture-curable solvent-free one-component modified silicone resin elastic glue, which was contained in a cartridge, was used.

Then, a glass vacuum lifter, which has the maximum vacuum capacity of 60 kg, was used to attached itself to the first decorative laminate for application from its front side. The back side of the first decorative laminate was then attached with pressure to a base material made of a plaster board.

Then, the second decorative laminate, which is the other one of the paired two decorative laminates, for application to a base material was obtained by cutting the obtained melamine decorative laminate, adhering the double-sided adhesive tapes thereto, and applying the elastic glue thereto as with the first decorative laminate. The gapping construction was performed in which the second decorative laminate is spaced apart from the first decorative laminate and is fixed to the base material. As shown in FIG. 5, there was provided a flat type jointer (5*a*) that has an elongated shape and is made of aluminum in a joint (4) between the first decorative laminate (9) and the second decorative laminate (9), which are spaced apart. As shown in FIG. 6, the flat type jointer (5*a*) includes a bottom piece (5*a*1), a cover piece (5*a*2), and a coupling portion (5*a*3) that couples the bottom piece (5*a*1) and the cover piece (5*a*2) at respective middle parts thereof. The bottom piece (5*a*1) and the cover piece (5*a*2) each have a planar shape. The bottom piece (5*a*1) was inserted between the base material (21) and the first decorative laminate (9). And, the bottom piece (5*a*1) was inserted between the base material (21) and the second decorative laminate (9). The coupling portion (5*a*3) was inserted in the joint (4). The cover piece (5*a*2) sealed the joint (4). The gap (30) shown in FIG. 22 between the coupling portion (5*a*3) and the end surface of each decorative laminate (9) has a width (t) of 1.5 mm.

EXAMPLE 2

Paired two decorative laminates were prepared in the same manner as in Example 1, except that an acrylic double-sided adhesive tape B was used in replacement of the acrylic double-sided adhesive tape A. The acrylic double-sided adhesive tape B has the entire thickness of 0.1 mm. The acrylic double-sided adhesive tape B comprises, as the support body, a PET film that has a thickness of 0.02 mm. An adhesive layer on each side of the acrylic double-sided adhesive tape B has a thickness of 0.04 mm.

EXAMPLE 3

Paired two decorative laminates were prepared in the same manner as in Example 1, except that an acrylic double-sided adhesive tape C was used in replacement of the acrylic double-sided adhesive tape A. The acrylic double-sided adhesive tape C has the entire thickness of 4 mm. The acrylic double-sided adhesive tape C comprises, as the support body, the polyethylene-based foamed resin body that has a thickness of 3.80 mm. An adhesive layer on each side of the acrylic double-sided adhesive tape C has a thickness of 0.10 mm.

EXAMPLE 4

Production of Melamine Resin-Impregnated Decorative Paper

A decorative paper in a wood grain pattern was impregnated with resin liquid mainly composed of melamine-formaldehyde resin such that the impregnation rate as defined by Formula 1 was 130% and was then dried to obtain a melamine resin-impregnated decorative paper.

Production of Prepreg

A glass fiber nonwoven fabric having a basis weight of 75 g/m² (binder component: thermoplastic resin emulsion, a thickness of 0.585 mm, and a density of 0.130 g/cm³) was impregnated with a slurry such that the impregnation rate of the slurry as defined by Formula 1 was 1200% and was then dried to obtain a prepreg. The slurry was blended with 4.5 part by weight of phenol-formaldehyde resin, 3.5 part by weight of melamine-formaldehyde resin, 16.5 part by weight of calcium carbonate having an average particle diameter of 1.4 μm as the small particle diameter inorganic filler, 37.5 part by weight of aluminum hydroxide having an average particle diameter of 8 μm as the medium particle diameter inorganic filler, and 37.5 part by weight of aluminum hydroxide having an average diameter of 20 μm as the large particle diameter inorganic filler. Here, the average particle diameter of the small particle diameter inorganic filler was measured using an electron microscope. The respective average particle diameters of the medium particle diameter inorganic filler and the large particle diameter inorganic filler were measured using the laser diffraction/scattering method.

Production of Non-combustible Decorative Laminate

A non-combustible decorative laminate was obtained by stacking one sheet of melamine resin-impregnated decorative paper in a wood grain pattern, five sheets of prepregs, and one sheet of melamine resin-impregnated decorative paper in a wood grain pattern in this order from the bottom to produce a stacked body and forming the stacked body under heat and pressure.

Paired two decorative laminates were prepared in the same manner as in Example 1, except that the non-combustible laminate was used in replacement of the melamine decorative laminate.

EXAMPLE 5

Paired two decorative laminates were prepared in the same manner as in Example 2, except that the non-combustible decorative laminate was used in replacement of the melamine decorative laminate.

EXAMPLE 6

Paired two decorative laminates were prepared in the same manner as in Example 3, except that the non-combustible decorative laminate was used in replacement of the melamine decorative laminate.

EXAMPLE 7

Paired two decorative laminates were finished in the same manner as in Example 4, except that a silicone-based caulking agent (6) was filled in the joint (4) as shown in FIG. 7 in replacement of the flat type jointer (5a).

EXAMPLE 8

Paired two decorative laminates were finished in the same manner as in Example 4, except that a joint bottom tape (7), which is lager relative to the joint (4) to some extent, was adhered to the bottom of the joint (4) as shown in FIGS. 8 and 9 in replacement of the flat type jointer (5a). The joint bottom tape (7) is a decorative sheet with adhesive agent that has a thickness of 0.3 mm. The decorative sheet with adhesive agent is a decorative laminate having an adhesive layer on its one side, the decorative laminate being formed by stacking a decorative layer, which is made from a resin-impregnated decorative paper, and a core layer, which is made from a resin-impregnated fibrous base material.

EXAMPLE 9

Example 9 is difference from Example 4 in that the paired two decorative laminates (9, 9) were attached to an external corner portion (A) of the base material (21) as shown in FIG. 10.

Figure 23:
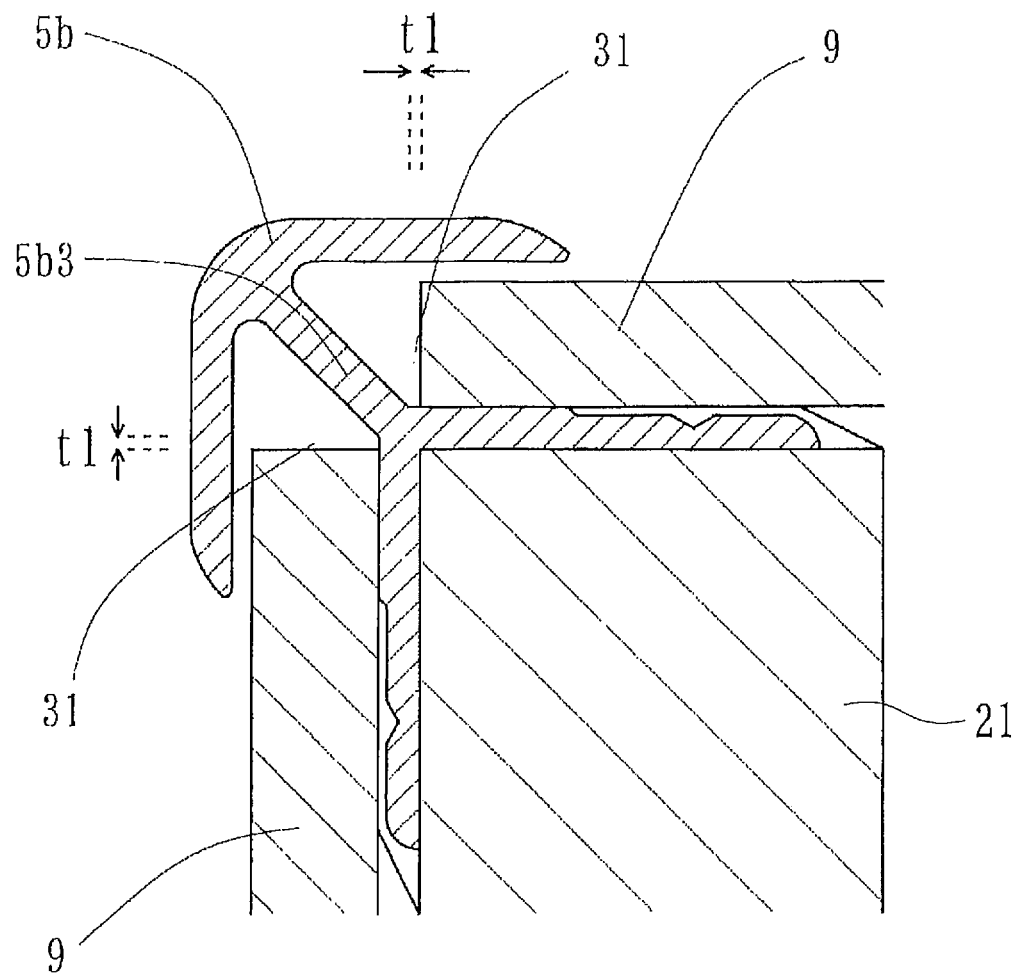
FIG. 23 is an enlarged sectional view of a main part of FIG. 10.

In Example 9, the paired two decorative laminates (9, 9) each were the non-combustible decorative laminate as in Example 4. The first decorative laminate (9), which is one of the paired two decorative laminates (9, 9), was adhered to a first surface of the external corner portion (A) of the base material (21). The second decorative (9), which is the other one of the paired two decorative laminates, was adhered to a second surface of the external corner portion (A) of the base material (21) that intersects the first surface of the external corner portion (A). The paired two decorative laminates (9, 9) were spaced apart from each other at the external corner portion (A) to form the joint (4). The joint (4) was provided with the jointer for external corner (5b) that is made of aluminum. The jointer for external corner (5b) includes a bottom piece (5b1), a cover piece (5b2), and a coupling portion (5b3) that couples the bottom piece (5b1) and the cover piece (5b2) together. The bottom piece (5b1) and the cover piece (5b2) each have an L-shape. The bottom piece (5b1) was inserted in a gap between the base material (21) and each decorative laminate (9, 9). The coupling portion (5b3) was inserted in the joint (4). The cover piece (5b2) sealed the joint (4). FIG. 23 is an enlarged sectional view of a main part of FIG. 10. Each end surface of the paired two decorative laminates (9, 9) and the coupling portion (5b3) of the jointer of arrow head type for external corner (5b) has a gap (31) at close range having a width (t1) of 1.5 mm.

EXAMPLE 10

Example 10 is different from Example 9 in that the paired two decorative laminates (9, 9) were spaced apart at the external corner portion (A) to fill the jointer for external corner (5c), which is made of aluminum, and the silicone-based caulking agent (6) therebetween as shown in FIG. 11A. The jointer for external corner (5c) includes an aluminum member (5c2) as a base material and a melamine resin-impregnated resin decorative laminate (5c1) that is adhered to a surface of the aluminum member (5c2). The silicone-based caulking agent (6) was filled between the jointer for external corner (5c) and the paired two decorative laminates (9, 9).

Figure 11B:
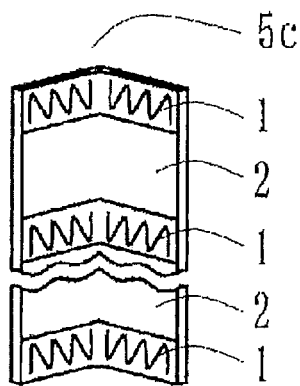
FIG. 11B is a perspective front view seen from a Z direction of FIG. 11A.

FIG. 11B is a perspective front view as seen from a Z direction in FIG. 11A. The external corner portion (A) of the base material (21) was sequentially applied with the elastic glue and the acrylic double-sided adhesive tape A (for adhesion of the jointer for external corner (5c)). The elastic glue for adhering the jointer for external corner (5c) to the base material (21) was the moisture-curable solvent free one-component modified silicone resin elastic glue.

EXAMPLE 11

Figure 24:
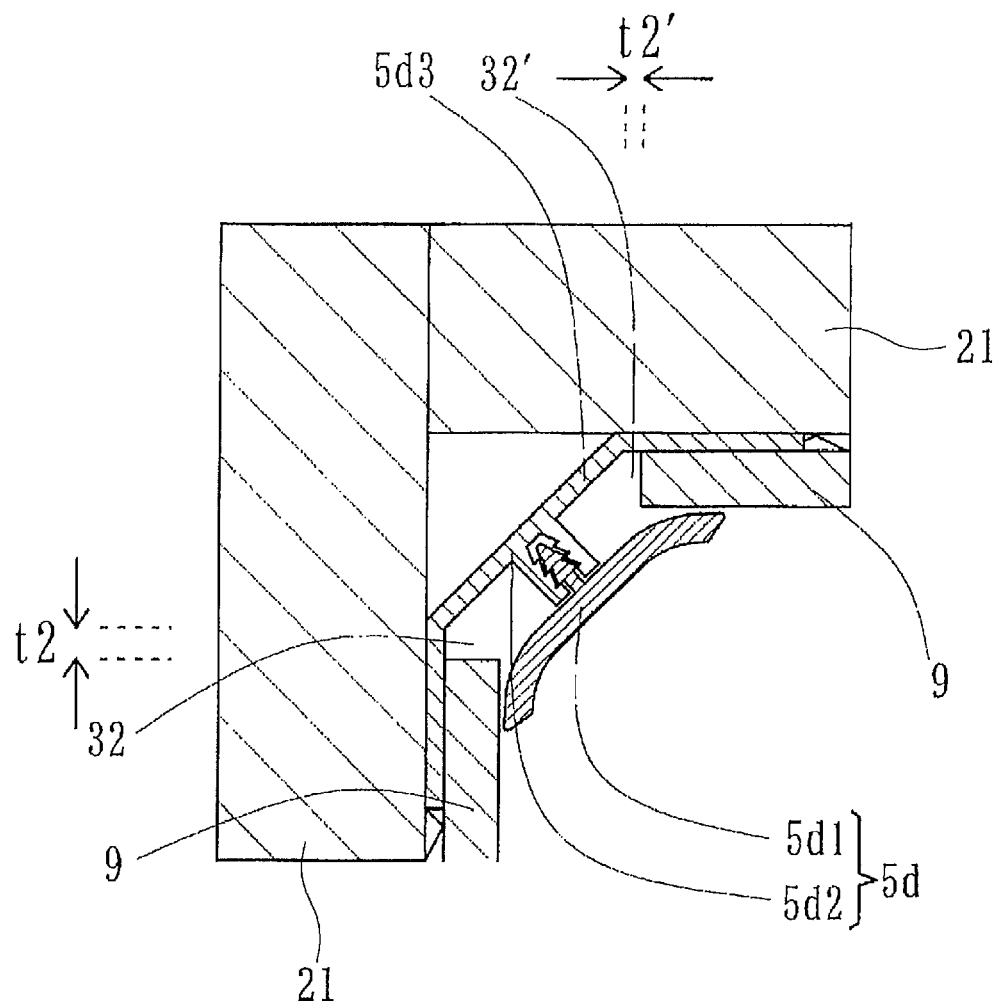
FIG. 24 is an enlarged sectional view of a main part of FIG. 12.

Example 11 is an example in which paired two decorative laminates (9, 9) were attached to an internal corner portion (B) of the base material (21) as shown in FIG. 12. The joint (4) between the paired two decorative laminates (9, 9) was provided with the jointer for internal corner (5d) that is made of resin. The jointer for internal corner (5d) comprises a cover member (5d1) and a base member (5d2). The base member (5d2) includes a bottom piece (5d3) and a fitting portion (5d4). The fitting portion (5d4) receives a fitting target portion (5d5) that protrudes from the center of the cover member (5d1). The paired two decorative laminates (9, 9) were fixed to the bottom piece (5d3) at both ends of the bottom piece (5d3) and were fixed to the cover member (5d1) at both ends of the cover member (5d1). FIG. 24 is an enlarged sectional view of a main part of FIG. 12. The respective end surfaces of the paired two decorative laminates (9, 9) and a bending portion of the bottom piece (5d3) have a gap (32) and a gap (32'), respectively, that have width (t2, t2') of 2.5 mm and 1.5 mm.

EXAMPLE 12

Example 12 is different from Example 11 in that the joint (4) between the paired two decorative laminates (9, 9) was provided with the jointer for internal corner (5e) as shown in FIG. 13.

The first decorative laminate (9), which is one of the paired two decorative laminates (9, 9), was brought into abutment with the internal corner portion (B) of the base material (21) and the end surface of the second decorative laminate, which is the other one of the paired two decorative laminates, was spaced apart from an outer edge of an inner surface of the first decorative laminate to form the joint (4) and to cause the outer edge of the first decorative laminate (9) and the end surface of the second decorative laminate (9) to face each other.

The back side of the decorative laminate (9), which was the non-combustible decorative laminate, was treated in the same manner as in Example 4. The glass vacuum lifter was used to attach itself to the decorative laminate (9) from its front side in the same manner as in Example 4. And then, an internal corner treatment was performed in which the jointer for internal corner (5e), which is made of aluminum, and the paired two decorative laminates (9, 9) were attached to the internal corner portion (B) as shown in FIG. 13.

Figure 25:
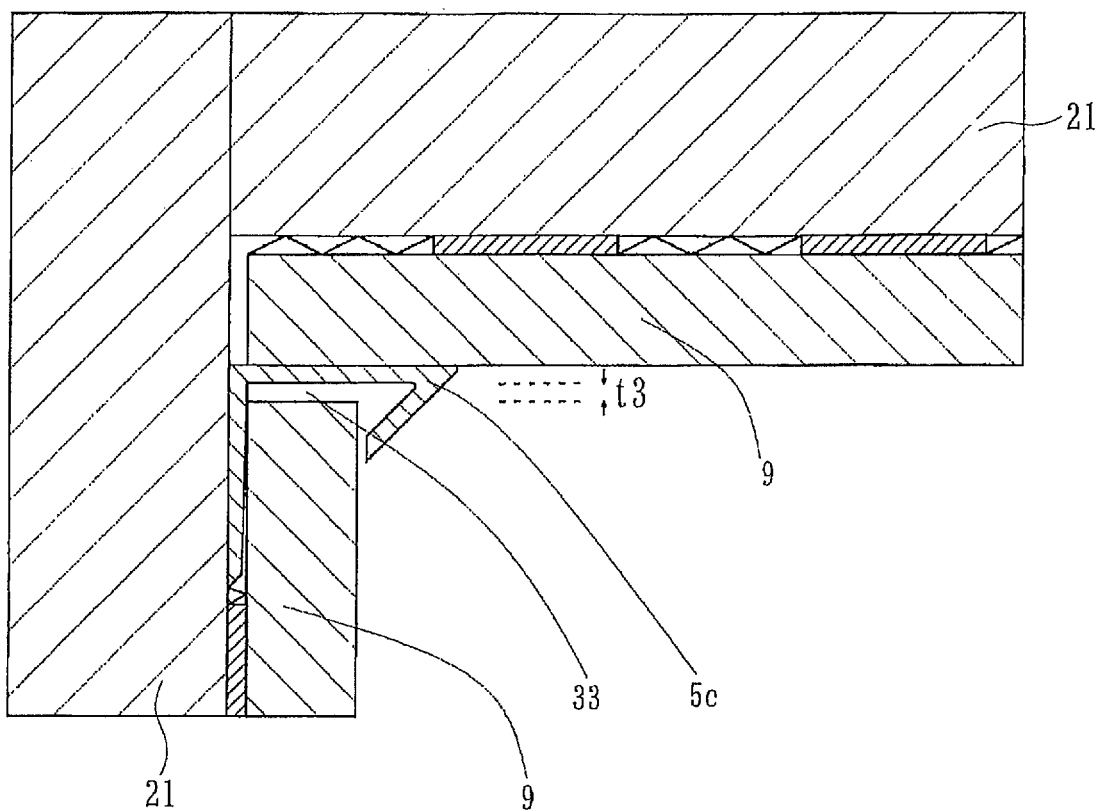
FIG. 25 is an enlarged sectional view of a main part of FIG. 13.

FIG. 25 is an enlarged sectional view of a main part of FIG. 13. The end surface of the second decorative laminate (9) and the jointer for internal corner (5e) had a gap (33) that has a width (t3) of 1.5 mm.

EXAMPLE 13

A decorative laminate was produced in the same manner as in Example 4, except that a non-combustible decorative laminate for application to a base material, which has a width of 935 mm and a length of 2455 mm, was used and divided into six sections.

EXAMPLE 14

A decorative laminate was produced in the same manner as in Example 4, except that the slurry for use as the inorganic filler for the prepreg was blended with 16.5 part by weight of calcium carbonate having an average particle diameter of 1.4 µm, 37.5 part by weigh of calcium carbonate having an average particle diameter of 8 µm, and 37.5 part by weight of calcium carbonate having an average particle diameter of 17 µm. And, butyl rubber-based adhesive agent having the entire thickness of 1 mm was used in replacement of the acrylic double-sided adhesive tape A. The butyl rubber-based adhesive agent includes a polyethylene-based foamed resin body having a thickness of 0.80 mm as the support body. An adhesive layer on each side of the butyl rubber-based adhesive agent has a thickness of 0.10 mm.

EXAMPLE 15

A decorative laminate was produced in the same manner as in Example 4, except that the slurry for use as the inorganic filler for the prepreg was blended with 16.5 part by weight of aluminum hydroxide having an average particle diameter of 1.0 µm, 37.5 part by weight of aluminum hydroxide having an average particle diameter of 8 µm, and 37.5 part by weight aluminum hydroxide having an average particle diameter of 20 µm. And, the calcium silicate board having a thickness of 9 mm was used as the base material in replacement of the plaster board.

EXAMPLE 16

A decorative laminate was produced in the same manner as in Example 14, except that the binder components of the prepreg were 0 part by weight of phenol-formaldehyde resin and 8 part by weight of melamine-formaldehyde resin. And, the calcium silicate board having a thickness of 9 mm was used as the base material in replacement of the plaster board. Further, calcium silicate board was applied with acrylic primer on its surface using a roll coater such that the application quantity was 10 g/m² in solid content.

EXAMPLE 17

A decorative laminate was produced in the same manner as in Example 14, except that the binder components of the prepreg were 8 part by weight of phenol-formaldehyde resin and 0 part by weight of melamine-formaldehyde resin. And, the calcium silicate board having a thickness of 9 mm was used as the base material in replacement of the plaster board. Further, the calcium silicate board was applied with polyurethane-based primer on its surface using the roll coater such that the application quantity was 10 g/m² in solid content.

EXAMPLE 18

A decorative laminate was produced in the same manner as in Example 15, except that the binder components of the prepreg were 0 part by weight of phenol-formaldehyde resin and 8 part by weight of melamine-formaldehyde resin. And, a plywood having a thickness of 9 mm was used as the base material in replacement of the calcium silicate board having a width of 9 mm. The plywood was applied with acrylic primer on its surface such that the application quantity was 10 g/m² in solid content.

EXAMPLE 19

A decorative laminate was produced in the same manner as in Example 15, except that the binder components of the prepreg were 8 part by weight of phenol-formaldehyde resin and 0 part by weight of melamine-formaldehyde resin. And, mortar having a thickness of 9 mm was used as the base material in replacement of the calcium silicate board having a thickness of 9 mm. Further, the mortar was applied with acrylic primer on its surface such that the application quantity was 10 g/m² in solid content.

EXAMPLE 20

A decorative laminate was produced in the same manner as in Example 4, except that the slurry for use as the inorganic filler for the prepreg was blended with 16.5 part by weight calcium carbonate having an average particle diameter of 1.4 μm, 37.5 part by weight of calcium carbonate having an average particle diameter of 8 μm, and 37.5 part by weight of calcium carbonate having an average particle diameter 17 μm. And, the rubber-based glue was used in replacement of the modified silicone resin glue.

EXAMPLE 21

A decorative laminate was produced in the same manner as in Example 4, except that the slurry for use as the inorganic filler for the prepreg was blended with 16.5 part by weight of aluminum hydroxide having an average particle diameter of 1.0 μm, 37.5 part by weight of aluminum hydroxide having an average particle diameter of 8 μm, and 37.5 part by weight of aluminum hydroxide having an average particle diameter of 20 μm. And, urethane-based glue was used in replacement of the modified silicone resin glue.

EXAMPLE 22

A decorative laminate was produced in the same manner as in Example 14, except that the binder components of the prepreg were 0 part by weight of phenol-formaldehyde resin and 8 part by weight of melamine-formaldehyde resin. And, epoxy-based glue was used in replacement of the modified silicone resin glue.

EXAMPLE 23

A decorative laminate was produced in the same manner as in Example 4, except that the slurry for use as the inorganic filler was blended with 6.5 part by weight of aluminum hydroxide having an average particle diameter of 1.0 μm, 42.5 part by weight of aluminum hydroxide having an average particle diameter of 8 μm, and 42.5 part by weight of aluminum hydroxide having an average particle diameter of 20 μm.

EXAMPLE 24

A decorative laminate was produced in the same manner as in Example 4, except that the slurry for use as the inorganic filler for the prepreg was blended with 51.5 part by weight of aluminum hydroxide having an average particle diameter 1.0 μm, 20 part by weight of aluminum hydroxide having an average particle diameter of 8 μm, and 20 part by weight of aluminum hydroxide having an average particle diameter of 20 μm.

EXAMPLE 25

A decorative laminate was produced in the same manner as in Example 4, except that the slurry for use as the inorganic filler for the prepreg was blended with 6.5 part by weight of calcium carbonate having an average particle diameter of 1.4 μm, 42.5 part by weight of calcium carbonate having an average particle diameter of 8 μm, and 42.5 part by weight of calcium carbonate having an average particle diameter of 17 μm.

EXAMPLE 26

A decorative laminate was produced in the same manner as in Example 4, except that the slurry for use as the inorganic filler for the prepreg was blended with 51.5 part by weight of calcium carbonate having an average particle diameter of 1.4 μm, 20 part by weight of calcium carbonate having an average particle diameter of 8 μm, and 20 part by weight of calcium carbonate having an average particle diameter of 17 μm.

Comparative Example 1

A decorative laminate was produced in the same manner as in Example 4, except that an acrylic double-sided adhesive tape A⁻ was used in replacement of the acrylic double-sided adhesive tape A. The acrylic double-sided adhesive tape A⁻ has the entire thickness of 0.02 mm and comprises, as the support body, a PET film that has a thickness of 0.004 mm. An adhesive layer on each side of the acrylic double-sided adhesive tape A⁻ has a thickness of 0.008 mm. The acrylic double-sided adhesive tape A⁻ was thinner than the elastic glue, which resulted in protrusion of the elastic glue. This consequently created mess around the decorative laminate. Further, the elastic glue could not be applied thickly. As a result, when the decorative laminate was adhered to the base material, only a portion of the decorative laminate, to which the elastic glue was applied, appeared to float up. This degraded appearance of the decorative laminate. Further, the adhesive strength could not be maintained, which resulted in slippage of the decorative laminate when being cured.

Comparative Example 2

A decorative laminate was produced in the same manner as in Example 4, except that an acrylic double-sided adhesive tape A⁺ was used in replacement of the acrylic double-sided adhesive tape A. The acrylic double-sided adhesive tape A⁺ has the entire thickness of 20 mm and comprises, as the support, the polyethylene-based foamed resin body having a thickness of 11.80 mm. An adhesive layer on each side of the acrylic double-sided adhesive tape A⁺ is 0.10 mm. The acrylic double-sided adhesive tape A⁺ was thicker than the elastic glue, which reduced the adhesive area of the elastic glue. Consequently, the adhesive strength could not be maintained, which resulted in slippage of the decorative laminate when being cured.

Comparative Example 3

A decorative laminate was produced in the same manner as in Example 4, except that an acrylic double-sided adhesive tape X⁻ was used in replacement of the acrylic double-sided adhesive tape A. The acrylic double-sided adhesive tape X⁻ has an adhesive strength as shown in Table 3-2 and has the entire thickness of 0.03 mm. The acrylic double-sided adhesive tape X⁻ comprises, as the support body, a PET film that has a thickness of 0.004 mm. An adhesive layer on each side of the acrylic double-sided adhesive tape X⁻ has a thickness of 0.013 mm. The adhesive strength of the acrylic double-sided adhesive tape X⁻ was weak, which caused slippage of the decorative laminate when being cured. Therefore, the decorative laminate was fixed to the base material using gummed paper tapes at some places in end portions of the decorative laminate.

Comparative Example 4

A decorative laminate was produced in the same manner as in Example 4, except that an acrylic double-sided adhesive tape X⁺ was used in replacement of the acrylic double-sided adhesive tape A. The acrylic double-sided adhesive tape X⁺ has an adhesive strength as shown in Table 3-2 and has the entire thickness of 0.2 mm. The acrylic double-sided adhesive tape X⁺ comprises, as the support body, a PET film that has a thickness of 0.12 mm. An adhesive layer on each side of the acrylic double-sided adhesive tape X⁺ has a thickness of 0.04 mm. Adhesive strengths of the acrylic double-sided adhesive tape X⁺ at temperatures of 23° C. and 0° C. are great, which inhibited the decorative laminate from being slipped when being adhered to the base material. As a result, it was difficult to position the decorative laminate in place.

Configurations of the base materials and the decorative laminates are shown in Table 1.

TABLE 1

|  | Base Material | Primer | Decorative Laminate |
|---|---|---|---|
| Example 1 | Plaster Board | — | Melamine Decorative Laminate |
| Example 2 | Plaster Board | — | Melamine Decorative Laminate |
| Example 3 | Plaster Board | — | Melamine Decorative Laminate |
| Example 4 | Plaster Board | — | Non-combustible Decorative Laminate |
| Example 5 | Plaster Board | — | Non-combustible Decorative Laminate |
| Example 6 | Plaster Board | — | Non-combustible Decorative Laminate |
| Example 7 | Plaster Board | — | Non-combustible Decorative Laminate |
| Example 8 | Plaster Board | — | Non-combustible Decorative Laminate |
| Example 9 | Plaster Board | — | Non-combustible Decorative Laminate |
| Example 10 | Plaster Board | — | Non-combustible Decorative Laminate |
| Example 11 | Plaster Board | — | Non-combustible Decorative Laminate |
| Example 12 | Plaster Board | — | Non-combustible Decorative Laminate |
| Example 13 | Plaster Board | — | Non-combustible Decorative Laminate |
| Example 14 | Plaster Board | — | Non-combustible Decorative Laminate |
| Example 15 | Calcium Silicate Board | — | Non-combustible Decorative Laminate |
| Example 16 | Calcium Silicate Board | Acrylic Based | Non-combustible Decorative Laminate |
| Example 17 | Calcium Silicate Board | Polyurethane Based | Non-combustible Decorative Laminate |
| Example 18 | Plywood | Acrylic Based | Non-combustible Decorative Laminate |
| Example 19 | Mortar | Acrylic Based | Non-combustible Decorative Laminate |
| Example 20 | Plaster Board | — | Non-combustible Decorative Laminate |
| Example 21 | Plaster Board | — | Non-combustible Decorative Laminate |
| Example 22 | Plaster Board | — | Non-combustible Decorative Laminate |
| Example 23 | Plaster Board | — | Non-combustible Decorative Laminate |
| Example 24 | Plaster Board | — | Non-combustible Decorative Laminate |
| Example 25 | Plaster Board | — | Non-combustible Decorative Laminate |
| Example 26 | Plaster Board | — | Non-combustible Decorative Laminate |
| Comparative Example 1 | Plaster Board | — | Non-combustible Decorative Laminate |
| Comparative Example 2 | Plaster Board | — | Non-combustible Decorative Laminate |
| Comparative Example 3 | Plaster Board | — | Non-combustible Decorative Laminate |
| Comparative Example 4 | Plaster Board | — | Non-combustible Decorative Laminate |

Application methods are shown in Tables 2.

TABLE 2

| | Application | | | | |
|---|---|---|---|---|---|
| | Back Side Treatment of Decorative Laminate | | Joint Treatment | | |
| | Double-sided Adhesive Tape | Elastic Glue | Jointer | Caulking Agent | Joint Bottom Tape |
| Example 1 | Acrylic A | Modified Silicone MS | Flat Type | — | — |
| Example 2 | Acrylic B | Modified Silicone | Flat Type | — | — |
| Example 3 | Acrylic C | Modified Silicone | Flat Type | — | — |
| Example 4 | Acrylic A | Modified Silicone | Flat Type | — | — |
| Example 5 | Acrylic B | Modified Silicone | Flat Type | — | — |
| Example 6 | Acrylic C | Modified Silicone | Flat Type | — | — |
| Example 7 | Acrylic A | Modified Silicone | — | Silicone Based | — |
| Example 8 | Acrylic A | Modified Silicone | — | — | Decorative Sheet |
| Example 9 | Acrylic A | Modified Silicone | Arrow Head Type for External Corner | — | — |
| Example 10 | Acrylic A | Modified Silicone | L-letter Type for External Corner | — | — |
| Example 11 | Acrylic A | Modified Silicone | Fit Type for Internal Corner | — | — |

TABLE 2-continued

| | Application | | | | |
|---|---|---|---|---|---|
| | Back Side Treatment of Decorative Laminate | | Joint Treatment | | |
| | Double-sided Adhesive Tape | Elastic Glue | Jointer | Caulking Agent | Joint Bottom Tape |
| Example 12 | Acrylic A | Modified Silicone | L-letter type for Internal Corner | — | — |
| Example 13 | Acrylic A | Modified Silicone | Flat Type | — | — |
| Example 14 | Butyl Rubber | Modified Silicone | Flat Type | — | — |
| Example 15 | Acrylic A | Modified Silicone | Flat Type | — | — |
| Example 16 | Acrylic A | Modified Silicone | Flat Type | — | — |
| Example 17 | Acrylic A | Modified Silicone | Flat Type | — | — |
| Example 18 | Acrylic A | Modified Silicone | Flat Type | — | — |
| Example 19 | Acrylic A | Modified Silicone | Flat Type | — | — |
| Example 20 | Acrylic A | Rubber Based R | Flat Type | — | — |
| Example 21 | Acrylic A | Urethane Based U | Flat Type | — | — |
| Example 22 | Acrylic A | Epoxy Based E | Flat Type | — | — |
| Example 23 | Acrylic A | Modified Silicone | Flat Type | — | — |
| Example 24 | Acrylic A | Modified Silicone | Flat Type | — | — |
| Example 25 | Acrylic A | Modified Silicone | Flat Type | — | — |
| Example 26 | Acrylic A | Modified Silicone | Flat Type | — | — |
| Comparative Example 1 | Acrylic A− | Modified Silicone | Flat Type | — | — |
| Comparative Example 2 | Acrylic A+ | Modified Silicone | Flat Type | — | — |
| Comparative Example 3 | Acrylic X− | Modified Silicone | Flat Type | — | — |
| Comparative Example 4 | Acrylic X+ | Modified Silicone | Flat Type | — | — |

Evaluation results are shown in Tables 3-1 to 3-3.

TABLE 3-1

| | Applicability | | | |
|---|---|---|---|---|
| | During Application | | | After Application |
| | Appearance | Absence of Protrusion of Glue | Positioning | Slippage of Decorative Laminate |
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Example 6 | ○ | ○ | ○ | ○ |
| Example 7 | ○ | ○ | ○ | ○ |
| Example 8 | ○ | ○ | ○ | ○ |
| Example 9 | ○ | ○ | ○ | ○ |
| Example 10 | ○ | ○ | ○ | ○ |
| Example 11 | ○ | ○ | ○ | ○ |
| Example 12 | ○ | ○ | ○ | ○ |
| Example 13 | ○ | ○ | ○ | ○ |
| Example 14 | ○ | ○ | ○ | ○ |
| Example 15 | ○ | ○ | ○ | ○ |
| Example 16 | ○ | ○ | ○ | ○ |
| Example 17 | ○ | ○ | ○ | ○ |
| Example 18 | ○ | ○ | ○ | ○ |
| Example 19 | ○ | ○ | ○ | ○ |
| Example 20 | ○ | ○ | ○ | ○ |
| Example 21 | ○ | ○ | ○ | ○ |
| Example 22 | ○ | ○ | ○ | ○ |
| Example 23 | ○ | ○ | ○ | ○ |
| Example 24 | ○ | ○ | ○ | ○ |
| Example 25 | ○ | ○ | ○ | ○ |
| Example 26 | ○ | ○ | ○ | ○ |
| Comparative Example 1 | x | x | ○ | x |
| Comparative Example 2 | — | ○ | ○ | x |
| Comparative Example 3 | x | x | ○ | x |
| Comparative Example 4 | ○ | ○ | x | ○ |

○: good,
x: poor

TABLE 3-2

| | 90-degree Peel Test | | | |
|---|---|---|---|---|
| | Decorative Laminate - Adhesive Tape | | Base Material - Adhesive Tape | |
| | 23° C. [N/20 mm] | 0° C. [N/20 mm] | 23° C. [N/20 mm] | 0° C. [N/20 mm] |
| Example 1 | 11 | 10 | 7 | 7 |
| Example 2 | 14 | 13 | 6 | 5 |
| Example 3 | 14 | 12 | 6 | 5 |
| Example 4 | 11 | 10 | 7 | 7 |
| Example 5 | 14 | 13 | 6 | 5 |
| Example 6 | 14 | 12 | 6 | 5 |
| Example 7 | 11 | 10 | 7 | 7 |
| Example 8 | 11 | 10 | 7 | 7 |
| Example 9 | 11 | 10 | 7 | 7 |
| Example 10 | 11 | 10 | 7 | 7 |
| Example 11 | 11 | 10 | 7 | 7 |
| Example 12 | 11 | 10 | 7 | 7 |
| Example 13 | 11 | 10 | 7 | 7 |
| Example 14 | 14 | 13 | 7 | 6 |

TABLE 3-2-continued

| | 90-degree Peel Test | | | |
| --- | --- | --- | --- | --- |
| | Decorative Laminate - Adhesive Tape | | Base Material - Adhesive Tape | |
| | 23° C. [N/20 mm] | 0° C. [N/20 mm] | 23° C. [N/20 mm] | 0° C. [N/20 mm] |
| Example 15 | 11 | 10 | 5 | 5 |
| Example 16 | 11 | 10 | 12 | 9 |
| Example 17 | 11 | 10 | 13 | 8 |
| Example 18 | 11 | 10 | 10 | 8 |
| Example 19 | 11 | 10 | 6 | 5 |
| Example 20 | 11 | 10 | 7 | 7 |
| Example 21 | 11 | 10 | 7 | 7 |
| Example 22 | 11 | 10 | 7 | 7 |
| Example 23 | 11 | 10 | 7 | 7 |
| Example 24 | 11 | 10 | 7 | 7 |
| Example 25 | 11 | 10 | 7 | 7 |
| Example 26 | 11 | 10 | 7 | 7 |
| Comparative Example 1 | — | — | — | — |
| Comparative Example 2 | — | — | — | — |
| Comparative Example 3 | 2.9 | 2.7 | 2.5 | 2.1 |
| Comparative Example 4 | 34 | 32 | 31 | 30 |

TABLE 3-3

| | Tensile Test in Building Research Institute Method [kN] | Thickness of Double-sided Adhesive Tape [mm] |
| --- | --- | --- |
| Example 1 | 0.43 | 1 |
| Example 2 | 0.43 | 0.1 |
| Example 3 | 0.43 | 4 |
| Example 4 | 0.43 | 1 |
| Example 5 | 0.43 | 0.1 |
| Example 6 | 0.43 | 4 |
| Example 7 | 0.43 | 1 |
| Example 8 | 0.43 | 1 |
| Example 9 | 0.43 | 1 |
| Example 10 | 0.43 | 1 |
| Example 11 | 0.43 | 1 |
| Example 12 | 0.43 | 1 |
| Example 13 | 0.43 | 1 |
| Example 14 | 0.43 | 1 |
| Example 15 | 0.73 | 1 |
| Example 16 | 0.48 | 1 |
| Example 17 | 0.65 | 1 |
| Example 18 | 0.68 | 1 |
| Example 19 | 0.47 | 1 |
| Example 20 | 0.20 | 1 |
| Example 21 | 0.57 | 1 |
| Example 22 | 0.49 | 1 |
| Example 23 | 0.43 | 1 |
| Example 24 | 0.43 | 1 |
| Example 25 | 0.43 | 1 |
| Example 26 | 0.43 | 1 |
| Comparative Example 1 | — | 0.02 |
| Comparative Example 2 | — | 20 |
| Comparative Example 3 | 0.43 | 0.03 |
| Comparative Example 4 | 0.43 | 0.2 |

Blending ratios of the slurries according to Example 4 to Example 26 are shown in Tables 4-1 to 4-3.

TABLE 4-1

| | (A) Organic Resin Components [part by weight] | |
| --- | --- | --- |
| | Phenol-formaldehyde Resin | Melamine-formaldehyde Resin |
| Example 1 | — | — |
| Example 2 | — | — |
| Example 3 | — | — |
| Example 4 | 4.5 | 3.5 |
| Example 5 | 4.5 | 3.5 |
| Example 6 | 4.5 | 3.5 |
| Example 7 | 4.5 | 3.5 |
| Example 8 | 4.5 | 3.5 |
| Example 9 | 4.5 | 3.5 |
| Example 10 | 4.5 | 3.5 |
| Example 11 | 4.5 | 3.5 |
| Example 12 | 4.5 | 3.5 |
| Example 13 | 4.5 | 3.5 |
| Example 14 | 4.5 | 3.5 |
| Example 15 | 4.5 | 3.5 |
| Example 16 | 0 | 8 |
| Example 17 | 8 | 0 |
| Example 18 | 0 | 8 |
| Example 19 | 8 | 0 |
| Example 20 | 4.5 | 3.5 |
| Example 21 | 4.5 | 3.5 |
| Example 22 | 0 | 8 |
| Example 23 | 4.5 | 3.5 |
| Example 24 | 4.5 | 3.5 |
| Example 25 | 4.5 | 3.5 |
| Example 26 | 4.5 | 3.5 |
| Comparative Example 1 | 4.5 | 3.5 |
| Comparative Example 2 | 4.5 | 3.5 |
| Comparative Example 3 | 4.5 | 3.5 |
| Comparative Example 4 | 4.5 | 3.5 |

○: good,
x: poor

TABLE 4-2

| | (B) Inorganic Filler | | |
| --- | --- | --- | --- |
| | (b1) Inorganic Substance other than Endothermic Metal Hydroxide | | |
| | Small Particle Diameter [μm] | Medium Particle Diameter [μm] | Large Particle Diameter [μm] |
| Example 1 | — | — | — |
| Example 2 | — | — | — |
| Example 3 | — | — | — |
| Example 4 | 16.5 | — | — |
| Example 5 | 16.5 | — | — |
| Example 6 | 16.5 | — | — |
| Example 7 | 16.5 | — | — |
| Example 8 | 16.5 | — | — |
| Example 9 | 16.5 | — | — |
| Example 10 | 16.5 | — | — |
| Example 11 | 16.5 | — | — |
| Example 12 | 16.5 | — | — |
| Example 13 | 16.5 | — | — |
| Example 14 | 16.5 | 37.5 | 37.5 |
| Example 15 | — | — | — |
| Example 16 | 16.5 | 37.5 | 37.5 |
| Example 17 | 16.5 | 37.5 | 37.5 |

TABLE 4-2-continued

| | (B) Inorganic Filler | | |
|---|---|---|---|
| | (b1) Inorganic Substance other than Endothermic Metal Hydroxide | | |
| | Small Particle Diameter [μm] | Medium Particle Diameter [μm] | Large Particle Diameter [μm] |
| Example 18 | — | — | — |
| Example 19 | — | — | — |
| Example 20 | 16.5 | 37.5 | 37.5 |
| Example 21 | — | — | — |
| Example 22 | 16.5 | 37.5 | 37.5 |
| Example 23 | — | — | — |
| Example 24 | 0 | 0 | 0 |
| Example 25 | 6.5 | 42.5 | 42.5 |
| Example 26 | 51.5 | 20 | 20 |
| Comparative Example 1 | 16.5 | — | — |
| Comparative Example 2 | 16.5 | — | — |
| Comparative Example 3 | 16.5 | — | — |
| Comparative Example 4 | 16.5 | — | — |

○: good,
x: poor

TABLE 4-3

| | (B) Inorganic Filler | | |
|---|---|---|---|
| | (b2) Endothermic Metal Hydroxide | | |
| | Small Particle Diameter [μm] | Medium Particle Diameter [μm] | Large Particle Diameter [μm] |
| Example 1 | — | — | — |
| Example 2 | — | — | — |
| Example 3 | — | — | — |
| Example 4 | — | 37.5 | 37.5 |
| Example 5 | — | 37.5 | 37.5 |
| Example 6 | — | 37.5 | 37.5 |
| Example 7 | — | 37.5 | 37.5 |
| Example 8 | — | 37.5 | 37.5 |
| Example 9 | — | 37.5 | 37.5 |
| Example 10 | — | 37.5 | 37.5 |
| Example 11 | — | 37.5 | 37.5 |
| Example 12 | — | 37.5 | 37.5 |
| Example 13 | — | 37.5 | 37.5 |
| Example 14 | — | — | — |
| Example 15 | 16.5 | 37.5 | 37.5 |
| Example 16 | — | — | — |
| Example 17 | — | — | — |
| Example 18 | 16.5 | 37.5 | 37.5 |
| Example 19 | 16.5 | 37.5 | 37.5 |
| Example 20 | — | — | — |
| Example 21 | 16.5 | 37.5 | 37.5 |
| Example 22 | — | — | — |
| Example 23 | 6.5 | 42.5 | 42.5 |
| Example 24 | 51.5 | 20 | 20 |
| Example 25 | 0 | 0 | 0 |
| Example 26 | 0 | 0 | 0 |
| Comparative Example 1 | — | 37.5 | 37.5 |
| Comparative Example 2 | — | 37.5 | 37.5 |
| Comparative Example 3 | — | 37.5 | 37.5 |
| Comparative Example 4 | — | 37.5 | 37.5 |

○: good,
x: poor

Evaluation results of the non-combustible decorative laminate are shown in Table 5.

TABLE 5

| | Non-combustibility Test | | | |
|---|---|---|---|---|
| | 10-minute Test | | 20-minute Test | |
| | Total Heat Release MJ/m$^2$ | Shape Retention — | Total Heat Release MJ/m$^2$ | Shape Retention — |
| Example 4 | 3.8 | ○ | 4.8 | ○ |
| Example 14 | 6.4 | ○ | 6.8 | ○ |
| Example 15 | 4.5 | ○ | 6.4 | ○ |
| Example 16 | 6.2 | ○ | 6.3 | ○ |
| Example 17 | 4.0 | ○ | 7.6 | ○ |
| Example 23 | 3.7 | ○ | 6.4 | ○ |
| Example 24 | 3.4 | ○ | 6.0 | ○ |
| Example 25 | 4.5 | ○ | 7.2 | ○ |
| Example 26 | 4.4 | ○ | 7.1 | ○ |

○: good,
x: poor

The volume cumulative particle diameters of the inorganic filler, in which the three types of inorganic fillers are mixed, are shown in Table 6.

TABLE 6

| | Volume Cumulative Particle Diameter [μm] | | |
|---|---|---|---|
| | Dv (10) | Dv (50) | Dv (90) |
| Example 4 | 2.49 | 12.6 | 31.8 |
| Example 14 | 1.48 | 10.8 | 36 |
| Example 15 | 1.53 | 10.7 | 30.9 |
| Example 23 | 2.5 | 13.6 | 36.6 |
| Example 24 | 0.78 | 3.48 | 25.9 |
| Example 25 | 1.84 | 12.8 | 30.6 |
| Example 26 | 1.12 | 5.72 | 31 |

A method for evaluating applications of the decorative laminate according to the above-described Examples and Comparative Examples are as explained below.

(1) Appearance

A surface of the applied decorative laminate was visually observed. If the surface was flat, the appearance was evaluated as good. If unevenness was found due to the adhesive agent and/or the elastic glue, the appearance was evaluated as poor.

(2) Applicability

If the elastic glue did not protrude out of an end portion of the decorative laminate during application of the decorative laminate, the applicability was evaluated as good. If the elastic glue protruded out of the end portion of the decorative laminate, the applicability was evaluated as poor. Further, if it was possible to position the decorative laminate and the base material in place during adhesion, the applicability was evaluated as good. If the positioning was difficult, the applicability was evaluated as poor.

If no problems, such as slippage or warpage of the decorative laminate, occurred one day after the application, the applicability was evaluated as good. If the adhesive strength could not be maintained, which resulted in slippage of the decorative laminate, the applicability was evaluated as poor. If slight slippage occurred and it was necessary to reinforce the decorative laminate using a gummed paper tape, the applicability was evaluated as moderate.

(3) 90-Degree Peel Test

A peel test was conducted based on JIS Z 0237. An adhesive tape, which has a PET film (thickness of 25 μm) adhered on one side, was cut into a size of 20 mm (width)× 150 mm (length). The cut adhesive tape was thereafter adhered and joined to the base material and decorative laminate using a 2 kg pressure roller back and forth twice, and then left for three hours at a temperature of 0° C. or 23° C. Then, the adhesive tape was pulled in a 90-degree direction at a tensile speed of 300 mm/min under environment of 23° C. and 50% RH (relative humidity) to measure a 90-degree peel test force. The same measurement was conducted three times and an average of the results according to the three measurements was regarded as the 90-degree peel test force.

(4) Tensile Test in Building Research Institute Method (Measurement of Adhesion Strength of Elastic Glue)

The decorative laminate was cut into a piece having a size of 40 mm×40 mm. The elastic glue was applied onto the base material in the form of bead such that an application height was 4 mm. The cut piece and the base material were adhered to each other with a spacer therebetween set to be a height of 1 mm (a layer of the glue had a thickness of 1 mm). The adhered cut piece and the base material were cured for three days at a temperature of 23° C. and a relative humidity of 50%. A product made by the above-described procedures is regarded as a specimen. A surface of the decorative laminate, which is a part of the specimen, was adhered to a jig in size of 40 mm×40 mm using glue (cyanoacrylates). The specimen was cured for one day at a temperature of 23° C. and a relative humidity of 50%. Thereafter, an adhesive strength testing machine in Building Research Institute Method (manufactured by Oxjack Co., Ltd.) was used to apply a force to the specimen in a direction, in which the cut piece and the base material are peeled from each other, to thereby measure a tensile strength. The same measurement was conducted three times and an average of results according to the three measurements was regarded as the tensile strength.

(5) Non-Combustibility Test (10 Minutes)

Ten-minute heat release test was conducted in accordance with ISO5660 using a cone calorimeter. The method of evaluating the non-combustibility was as follows. If the total heat release was 8 $MJ/m^2$ or less, the maximum heat release rate did not exceed 200 k $W/m^2$ for 10 seconds or more consecutively, and the tested specimen did not have a breakage and/or a crack that penetrated the back side of the specimen, the non-combustibility was evaluated as good. If even one of these three conditions was unsatisfied, the non-combustibility was evaluated as poor.

(6) Non-Combustibility Test (20 Minutes)

Twenty-minute heat release test was conducted in accordance with ISO5660 using the cone calorimeter. The method of evaluating the non-combustibility was as follows. If the total heat release was 8 $MJ/m^2$ or less, the maximum heat release rate did not exceed 200 k $W/m^2$ for ten seconds or more consecutively, and the tested specimen did not have a breakage and/or a crack that penetrated the back side of the specimen, the non-combustibility was evaluated as good. If even one of these three conditions was unsatisfied, the non-combustibility was evaluated as poor.

(7) Volume Cumulative Particle Diameter

The volume cumulative particle diameters of the inorganic filler, in which the three types of inorganic fillers (B) are mixed at blending ratios according to Examples and Comparative Examples, were measured using a laser diffraction type particle size distribution measuring device (manufactured by Malvern Instruments Ltd., Model No.: Mastersizer 3000).

According to results of the above-described measurement, attachment configurations of the decorative laminates of the present disclosure (Examples 1 to 26) provided better appearance of the decorative laminate after application to the base material as compared with configurations of Comparative Examples. Further, the attachment configurations of the present application did not cause the elastic glue to protrude during and after the application. And, the attachment configurations of the present application showed advantageous adhesion in the peel test at a temperature of 23° C. or 0° C. and showed greater tensile strength of the decorative laminate.

As shown in Table 3-2, Example 14 particularly showed high adhesion between the decorative laminate and the adhesive tape. The reason for this is considered to result from use of the butyl rubber-based adhesive agent.

Examples 16 to 18 particularly showed high adhesion between the base material and the double-sided adhesive tape. The reason for this is considered to result from primer treatment performed on the base material.

In contrast, Comparative Examples 1 and 3 showed that the decorative laminate had poor appearance after the application. Also, the adhesive agent protruded during the application and slippage of the decorative laminate occurred after the application.

Others

1. An attachment configuration of decorative laminates comprises at least paired two decorative laminates attached a base material with a distance made therebetween. The at least paired two decorative laminates each include: a double-sided adhesive tape for outer side adhered to a back side of the decorative laminate, which faces the base material, at a position inward of an outer edge of the decorative laminate; a double-sided adhesive tape for inner side adhered to the back side at a position inward of the double-sided adhesive tape for outer side; elastic glue applied between the outer edge of the back side and the double-sided adhesive tape for outer side; and elastic glue applied to a portion of the back side at a position inward of the double-sided adhesive tape for outer side and where the double-sided adhesive tape for inner side is not adhered.

The double-sided adhesive tape for outer side is preferably adhered along the outer edge of the back side of the decorative laminate.

The double-sided adhesive tape for inner side is preferably adhered to the back side of the decorative laminate such that a portion, which is inward of the double-sided adhesive tape for outer side, is substantially equally partitioned into a section.

2. A method of applying decorative laminates to a base material, comprises steps of:
   (a) arranging a stepped member, which has a side wall extending in specific cut directions, on each decorative laminate of at least paired two decorative laminates and moving a saw in the specific cut directions with a blade guide of the saw brought into abutment with the side wall, to thereby cut the decorative laminate with a blade of the saw into an application size;
   (b) after the step (a), adhering a double-sided adhesive tape for outer side to a back side of the decorative laminate at a position inward of an outer edge of the decorative laminate and adhering a double sided adhesive tape for inner side to the back side of the decorative laminate at a position inward of the double-sided adhesive tape for outer side;

(c) after the step (c), applying elastic glue to a portion of the back side of the decorative laminate at a position between the outer edge and the double-sided adhesive tape for outer side and applying elastic glue to a portion of the back side of the decorative laminate at a position inward of the double-sided adhesive tape for outer side and where the double-sided adhesive tape for inner side is not adhered; and (d) after the step (c), fixing the at least paired two decorative laminates to the base material with a distance made between the at least paired two decorative laminates.

In the step (d), each decorative laminate of the at least paired two decorative laminates is preferably pressed against the base material using a vacuum lifter.

What is claimed is:

1. An attachment configuration of decorative laminates, comprising at least paired two decorative laminates attached to a base material, wherein the at least paired two decorative laminates each have a double-sided adhesive tape adhered to an outer circumferential portion on a back side of the decorative laminate and a double-sided adhesive tape adhered to an inner portion inward of the outer circumferential portion to form a section, wherein elastic glue is applied to an outside of the double-sided adhesive tape for the outer circumferential portion on the back side and the elastic glue is also applied within the section formed with the double-sided adhesive tape for the inner portion, wherein the elastic glue is solvent free one-component modified silicone resin-based glue, wherein the at least paired two decorative laminates are fixed to the base material on their respective back sides while being spaced apart from each other, wherein the at least paired two decorative laminates each include a decorative layer and a core layer, wherein the core layer is configured with a prepreg containing a fibrous base material, an organic binder component, and an inorganic filler, wherein the inorganic filler contains three types of inorganic fillers that have respective different average particle diameters, wherein the three types of inorganic fillers, which have the respective different average particle diameters, comprise:

a small particle diameter inorganic filler;
a medium particle diameter inorganic filler; and
a large particle diameter inorganic filler, wherein a blending ratio of the small particle diameter inorganic filler to the medium particle diameter inorganic filler to the large particle diameter inorganic filler in the core layer is 1:0.1 to 20:0.1 to 20, and wherein the double-sided adhesive tape has the entire thickness of 0.03 to 10 mm and has an adhesive strength of 3 to 30 N/20 mm at a temperature of 23° C. or an adhesive strength of 1 to 20 N/20 mm at a temperature of 0° C. according to 90-degree peel test based on JIS Z 0237.

2. The attachment configuration of the decorative laminates according to claim 1, wherein a portion, in which the at least paired two decorative laminates are spaced apart, is located in a plane, at an external corner, or at an internal corner of the attachment configuration.

3. The attachment configuration of the decorative laminates according to claim 1, wherein the portion, in which the at least paired two decorative laminates are spaced apart, is provided with one or more of a joint bottom tape, a jointer, or caulking agent.

4. The attachment configuration of the decorative laminates according to claim 1, wherein the elastic glue is moisture-curable reactive adhesive agent.

5. The attachment configuration of the decorative laminates according to claim 1, wherein the base material is a plaster board, a calcium silicate board, a plywood, or mortar.

6. The attachment configuration of the decorative laminates according to claim 1, wherein the base material is treated with a primer.

7. The attachment configuration of the decorative laminates according to claim 1, wherein a blending ratio of the organic binder component to the inorganic filler in the core layer by solid weight is 1:1-25.

8. The attachment configuration of the decorative laminates according to claim 1, wherein the inorganic filler is endothermic metal hydroxide, and/or an inorganic substance other than the endothermic metal hydroxide.

9. The attachment configuration of the decorative laminates according to claim 1, wherein an average particle diameter of the inorganic filler is 0.04 μm or more and less than 50 μm.

10. The attachment configuration of the decorative laminates according to claim 1, wherein the small particle diameter inorganic filler is 0.04 μm or more and less than 4 μm, wherein the medium particle diameter inorganic filler is 4 μm or more and less than 12 μm, and wherein the large particle diameter inorganic filler is 12 μm or more and less than 50 μm.

11. The attachment configuration of the decorative laminates according to claim 1, wherein the elastic glue has a tensile strength of 0.1 to 0.9 kN with respect to a metal jig having a size of 40 mm×40 mm according to measurement using an adhesive strength testing machine in Building Institute Method.

* * * * *